US008445577B2

(12) United States Patent
Lin et al.

(10) Patent No.: US 8,445,577 B2
(45) Date of Patent: May 21, 2013

(54) AMPHIPHILIC MULTI-ARM COPOLYMERS AND NANOMATERIALS DERIVED THEREFROM

(75) Inventors: Zhiqun Lin, Ames, IA (US); Xinchang Pang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 13/189,800

(22) Filed: Jul. 25, 2011

(65) Prior Publication Data
US 2013/0030120 A1 Jan. 31, 2013

(51) Int. Cl.
*C08K 3/10* (2006.01)

(52) U.S. Cl.
USPC ........... 524/403; 524/402; 524/413; 524/430; 524/432; 524/433; 524/436; 525/190; 525/242; 525/298; 525/301; 977/754; 977/810; 977/811

(58) Field of Classification Search
USPC .................. 525/190, 242, 298, 301; 977/754, 977/810, 811; 524/402, 403, 413, 430, 431, 524/432, 433, 436
See application file for complete search history.

(56) References Cited

U.S. PATENT DOCUMENTS
2008/0081192 A1* 4/2008 Goh et al. ...................... 428/407

OTHER PUBLICATIONS

Achermann, Marc, et al., "Energy-transfer pumping of semiconductor nanocrystals using an epitaxial quantum well", Nature, (Jun. 2004), 642-646.
Ackerson, Bruce J., "Shear induced order and shear processing of model hard sphere suspensions", J. Rheol., (May 1990), 553-590.
Alexe, M., et al., "Self-patterning nano-electrodes on ferroelectric thin films for gigabit memory applications", Applied Physics Letters, (Sep. 14, 1998), 1592-1594.
Alivisatos, A. P., "Semiconductor Clusters, Nanocrystals, and Quantum Dots", Science, (Feb. 1996), 933-937.
Alivisatos, M. Paul, et al., "Organization of 'nanocrystal molecules' using DNA", Nature, (Aug. 1996), 609-611.
Beck, J. S., et al., "A New Family of Mesoporous Molecular Sieves Prepared with Liquid Crystal Templates", J. Am. Chem. Soc., (1992), 10834-10843.
Beunen, Joseph A., et al., "Surface Tension Minimum in Ionic Surfactant Systems", http://pubs.rsc.org, (Jan. 1, 1978), 2501-2517.
Bhalla, A. S., et al., "The perovskite structure—a review of its role in ceramic science and technology", Mat Res Innovat, (2000), 3-26.

Binder, Wolfgang H., et al., "'Click' Chemistry in Polymer and Materials Science", Macromolecular Rapid Commun., (2007), 15-54.
Binks, B. P., et al., "Interfacial structure of solid-stabilised emulsions studied by scanning electron microscopy", Phys Chem Chem Phys, (2002), 3727-3733.
Binks, B. P., et al., "Particles Adsorbed at the Oil-Water Interface: A Theoretical Comparison between Spheres of Uniform Wettability and "Janus" Particles", Langmuir, (2001), 4708-4710.
Binks, Bernard P., "Particles as Surfactants—similarities and differences", Current Opinion in Colloid & Interface Science, (2002), 21-41.
Binks, Bernard P., et al., "Stability and Inversion of Solid-Stabilized Emulsions", Am. Chem Soc., (2002), 1 pg.
Bishop, Kyle J.M., et al., "Nanoscale Forces and Their Uses in Self-Assembly", Small, (2009), 1600-1630.
Borkovec, Michal, "From micelles to microemulsion droplets: Size distributions, shape fluctuations, and interfacial tensions", J. Chem. Phys, (Nov. 1989), 6268-6281.
Pang, Xinchang, et al., "Novel Amphiphilic Multi-Arm, Star-Like Block Copolymers as Unmolecular Micelles", Macromolecules 2011, 44, pubs.acs.org/Macromolecules, (2011), pp. 3746-3752.
Shinoda, Hosei, et al., "Improving the Structural Control of Graft Copolymers. Copolymerization of Poly (dimethylsiloxane) Macromonomer with Methyl Methacrylate Using Raft Polymerization", Macromolecular Rapid Commun., (2001), 1176-1181.
Stenzel-Rosenbaum, Martina, et al., "Star-Polymer Synthesis via Radical Reversible Adddition-Fragmentation Chain-Transfer Polymerization", Journal of Polymer Science, (2001), 2777-2783.
Wang, Xun, et al., "A general strategy for nanocrystal synthesis", Nature, (Sep. 2005), 121-124.

* cited by examiner

*Primary Examiner* — Robert Jones, Jr.
(74) *Attorney, Agent, or Firm* — Schwegman Lundberg & Woessner, P.A.

(57) ABSTRACT

The present invention relates to polymers, nanomaterials, and methods of making the same. Various embodiments provide an amphiphilic multi-arm copolymer. The copolymer includes a core unit and a plurality of amphiphilic block copolymer arms. Each block copolymer arm is substituted on the core unit. Each block copolymer arm includes at least one hydrophilic homopolymer subunit and at least one hydrophobic homopolymer subunit. In some examples, the copolymer can include a star-like or bottlebrush-like block copolymer, and can include a Janus copolymer. Various embodiments provide a nanomaterial. In some examples, the nanomaterial can include Janus nanomaterials, and can include nanoparticles, nanorods, or nanotubes. The nanomaterial includes the amphiphilic multi-arm copolymer and at least one inorganic precursor. The inorganic precursor can be coordinated to at least one homopolymer subunit of one of the amphiphilic block copolymer arms to form the nanomaterial. Various embodiments also provide methods of making the copolymer and the nanomaterial.

16 Claims, 1 Drawing Sheet

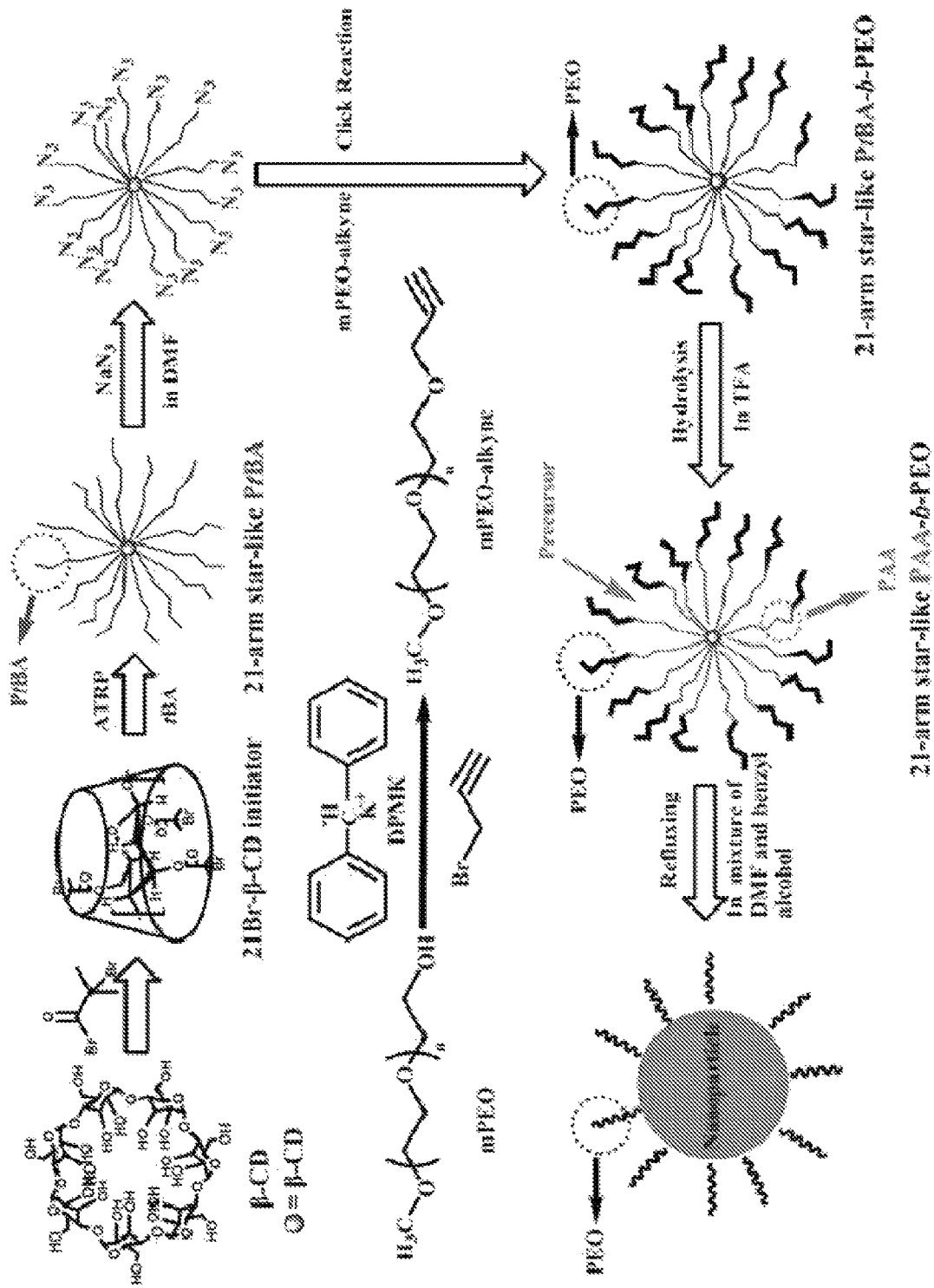

AMPHIPHILIC MULTI-ARM COPOLYMERS AND NANOMATERIALS DERIVED THEREFROM

STATEMENT OF GOVERNMENT SUPPORT

This invention was made with government support under Grant No. FA9550-09-1-0388 awarded by the United States Air Force. The government has certain rights in the invention.

BACKGROUND OF THE INVENTION

Polymers encompass a large class of natural and synthetic materials with a wide variety of properties. The ability to vary the properties of polymers, including boiling point, melting point, viscosity, polarity, tacticity, chain length, morphology, crystallinity, and mechanical characteristics, makes them useful in a variety of applications.

Nanotechnology is a rapidly advancing area of science. Nanostructures and nanomaterials (e.g., nanoparticles, nanorods, nanowires, nanotubes, etc.) can serve as building blocks or additives for other materials and they continue to receive considerable attention due to their intriguing and varied properties. Organometallic and organic solution phase synthetic routes have enabled the synthesis of functional inorganic quantum dots and nanoparticles. These nanomaterials form the building blocks for new bottom-up approaches to materials assembly for many technological applications. Nanotechnology continues to find new and useful application in the areas of optics, electronics, optoelectronics, magnetic technologies, sensory materials and devices, drug delivery, and biotechnology.

SUMMARY OF THE INVENTION

The present invention relates to polymers, nanomaterials, and methods of making the same. Various embodiments provide an amphiphilic multi-arm copolymer. The copolymer includes a core unit and a plurality of amphiphilic block copolymer arms. Each block copolymer arm is substituted on the core unit. Each block copolymer arm includes at least one hydrophilic homopolymer subunit and at least one hydrophobic homopolymer subunit. In some examples, the copolymer can include a star-like or bottlebrush-like block copolymer. Various embodiments provide a nanomaterial. In some examples, the nanomaterial can include Janus nanomaterials, and can include nanoparticles, nanorods, or nanotubes. The nanomaterial includes the amphiphilic multi-arm copolymer and at least one inorganic precursor. The inorganic precursor can be coordinated to at least one homopolymer subunit of one of the amphiphilic block copolymer arms to form the nanomaterial. Various embodiments also provide methods of making the copolymer and the nanomaterial.

Various embodiments of the present invention provide certain advantages over other polymers, nanomaterials, and methods of making the same, some of which are surprising and unexpected. In various embodiments, the copolymers of the present invention can be used as a template to synthesize a wider variety of nanomaterials than other strategies of using polymers. Some embodiments can be simpler and less expensive than other polymers, nanomaterials, and methods of making the same. In some embodiments, the method of making polymers or nanomaterials is more easily and cost-effectively scalable than other techniques. In some examples, the copolymers of the present invention can be more stable, more monodisperse, and more static than other copolymers. In some embodiments, the copolymers can form unimolecular micelles, and can act as nanoreactors to form nanomaterials when inorganic precursor coordinating compounds are added. In some embodiments, the nanomaterials of the present invention can have functionalized surfaces, including multifunctionalized surfaces; by first forming a copolymer that contains the functionalization and next building the nanostructure via addition of coordinating compound, the functionalized surfaces can be generated at a fraction of the cost and complexity with which other functionalized nanomaterials are generated. In some embodiments, the size of the nanomaterials generated can be precisely tailored by adjusting the length of the chain of polymer subunits to which the coordinating compounds associate; the size and monodispersity of the nanomaterials of some embodiments of the present invention can be easily and precisely controlled. In some embodiments, certain polymers can allow formation of inorganic-core nanomaterials, inorganic-shell nanomaterials, or nanomaterials including an inorganic-core and an inorganic-shell. In some examples of inorganic-shell nanomaterials, the inner-structural aspects of the resulting nanomaterial can be independent of the outer structural aspects that include the coordinating inorganic material; likewise, in some examples of nanomaterials with functionalized surfaces, the structural aspects of the functionalization can be independent of the structural aspects of the inorganic-core; thus, some embodiments of the present invention can circumvent some of the limitations of epitaxial growth. In some examples, for nanomaterials including an inorganic-core or inorganic-shell, the thickness of the inorganic-core or inorganic-shell can be precisely and easily controlled by altering the length of the chain of polymer subunits to which the inorganic precursor material coordinates. In some examples, the monodispersity of the copolymers and nanomaterials can be high, including due to the use of living polymerization to form the copolymers. In some examples, the approach of the present invention to synthesis of polymers and nanomaterials therefrom is simple, robust, and generalizable, allowing synthesis of a wide range of functional nanoparticles (including, for example, semiconducting, metallic, magnetic, ferroelectric, multiferroic, upconvering, ferroelectric, and the like) and multifunctional inorganic-core/inorganic-shell nanoparticles (including, for example, fluorescent/plasmonic, magnetic/plasmonic, upconverting/fluorescent, ferroelectric/magnetic, and the like). In some embodiments, the copolymers and nanomaterials of the present invention can be Janus structures, including Janus nanoparticles, Janus nanorods, and Janus nansotubes. The copolymers and nanomaterials of the present invention can have novel and useful properties, and can be made at large scale and at affordable cost, which can provide for applications in areas where nanomaterials and copolymers have been traditionally used, as well as uses in new areas that were before not possible or known. In various embodiments, potential areas of application include optical, nanoelectronic, optoelectronic, photovoltaic, magnetic, spintronic, sensory materials and devices, nanoreactors, catalysis, capacitors, actuators, transducers, superconductors, as well as nanotechnology, biotechnology and biomedical applications.

In various embodiments, the present invention provides an amphiphilic multi-arm copolymer. The copolymer includes a core unit. The polymer also includes a plurality of amphiphilic block copolymer arms. Each block copolymer arm is substituted on the core unit. Each block copolymer arm includes at least one hydrophilic homopolymer subunit and at least one hydrophobic homopolymer subunit. In some embodiments, the amphiphilic multi-arm copolymer can act as a template for the construction of nanomaterials.

In various embodiments, the present invention provides a method of making an amphiphilic multi-arm copolymer. The method includes providing a core that includes hydroxyl functional groups. The method includes contacting the core with a halogenated esterification reagent. The contacting gives a macro-initiator core that includes the core with at least some of the hydroxyl functional groups esterified by the halogenated esterification reagent. The method includes contacting the macro-initiator core with a first homopolymer subunit precursor. The contacting gives a first substituted core wherein the first substituted core includes the macro-initiator core wherein at least one halogen atom is replaced with a first homopolymer including subunits that include a reaction product of the first homopolymer subunit precursor. The method includes contacting the first substituted core with a second homopolymer subunit precursor. The second homopolymer subunit precursor is different than the first homopolymer subunit precursor. The contacting gives a second substituted core that includes the first substituted core wherein the first homopolymer is substituted with a second homopolymer that includes subunits that include a reaction product of the second homopolymer subunit precursor.

In various embodiments, the present invention provides a method of making a nanomaterial. The method includes contacting an amphiphilic multi-arm copolymer provided by embodiments of the present invention with an inorganic precursor. The contact forms a nanomaterial that includes the amphiphilic multi-arm copolymer coordinated to the inorganic precursor.

In various embodiments, the present invention provides a method of making a nanomaterial. The method includes the method of making an amphiphilic multi-arm copolymer. The method includes contacting the amphiphilic multi-arm copolymer with an inorganic precursor. The contacting forms a nanomaterial that includes the amphiphilic multi-arm copolymer coordinated to the inorganic precursor.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates the synthesis of a star-like PAA-b-PEO amphiphilic multi-arm copolymer via a combination of ATRP and click chemistry.

DETAILED DESCRIPTION OF THE INVENTION

Reference will now be made in detail to certain claims of the disclosed subject matter, examples of which are illustrated in the accompanying drawings. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated, or carried out simultaneously with other steps.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DEFINITIONS

The singular forms "a," "an" and "the" can include plural referents unless the context clearly dictates otherwise.

The term "about" can allow for a degree of variability in a value or range, for example, within 10%, or within 5% of a stated value or of a stated limit of a range. When a range or a list of sequential values is given, unless otherwise specified any value within the range or any value between the given sequential values is also disclosed.

The term "organic group" as used herein refers to but is not limited to any functional group that an organic chemist can envision, including halogen (i.e., F, Cl, Br, and I); an oxygen-containing group such as hydroxyl groups, alkoxy groups, aryloxy groups, aralkyloxy groups, oxo(carbonyl) groups, carboxyl groups including carboxylic acids, carboxylates, and carboxylate esters; a sulfur-containing group such as thiol groups, alkyl and aryl sulfide groups, sulfoxide groups, sulfone groups, sulfonyl groups, and sulfonamide groups; a nitrogen atom-containing group such as amines, hydroxylamines, nitriles, nitro groups, N-oxides, hydrazides, azides, and enamines; and other heteroatom-containing groups. Non-limiting examples of organic groups include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O) R', (CH$_2$)$_{0-2}$N(R')N(R')$_2$, N(R')N(R')C(O)R', N(R')N(R')C (O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N (R')$_2$, N(R')C(S)N(R')$_2$, N(COR')COR', N(OR')R', C(=NH) N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl, or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J. Examples of organic groups include linear and/or branched groups such as alkyl groups, fully or partially halogen-substituted haloalkyl groups, alkenyl groups, alkynyl groups, aromatic groups, acrylate functional groups, and methacrylate functional groups; and other organic functional groups such as ether groups, cyanate ester groups, ester groups, carboxylate salt groups, mercapto groups, sulfide groups, azide groups, phosphonate groups, phosphine groups, masked isocyano groups, and hydroxyl groups. Examples of organic groups include, but are not limited to, alkyl groups such as methyl, ethyl, propyl, isopropyl, n-butyl, s-butyl, and t-butyl groups, acrylate functional groups such as acryloyloxypropyl groups and methacryloyloxypropyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy (polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen-substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as actetoxyethyl and benzoyloxypropyl groups; hydroxy functional groups such as hydroxy and 2-hydroxyethyl groups; masked isocyanate functional groups such as propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; and metal salts of carboxylic acids such as the zinc, sodium, or potassium salts of 3-carboxypropyl and 2-carboxyethyl.

The term "substituted" as used herein refers to an organic group as defined herein in which one or more bonds to a hydrogen atom contained therein are replaced by one or more bonds to a non-hydrogen atom such as, but not limited to, a halogen (i.e., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S) N(R')$_2$, (CH$_2$)$_{0-2}$N(R')C(O)R', (CH$_2$)$_{0-2}$N(R')N(R')$_2$, N(R')N (R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR') COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to about 20 carbon atoms, and typically from 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$) =CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a C$_2$-heteroaryl can be a 5-ring with two carbon atoms and three heteroatoms, a 6-ring with two carbon atoms and four heteroatoms and so forth. Likewise a C$_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl-1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to an organic group or molecule that includes carbon and hydrogen atoms. The term can also refer to an organic group or molecule that normally includes both carbon and hydrogen atoms but wherein all the hydrogen atoms are substituted with other organic groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "amphiphilic" as used herein refers to a chemical compound possessing both hydrophilic and hydrophobic characteristics.

The term "molecule" as used herein refers to at least two atoms held together via chemical bonds, including ionic, covalent, or coordination bonds. In the present invention, the association of the inorganic precursor and the amphiphilic copolymer in the nanomaterial is considered to be a chemical bond, such that the complex of the inorganic precursor and the amphiphilic copolymer in the nanomaterial is a molecule.

The term "living polymerization" as used herein refers to a form of polymerization where the ability of growing polymer chain to terminate has been removed. In living polymerization, chain termination and chain transfer reactions are absent and the rate of chain initiation is also much larger than the rate of chain propagation. As a result, the polymer chains can grow at a more constant rate than seen in traditional chain polymerization and have a very low polydispersity index (e.g., their lengths remain very similar). Living polymerization is widely used to synthesize block copolymers since the polymer can be synthesized in stages, each stage containing a different monomer. Additional advantages include predetermined molar mass and control over end-groups. Living polymerization can be accomplished using a variety of methods, for example, atom-transfer radical polymerization (ATRP), reversible addition-fragmentation chain transfer polymerization (RAFT), anionic polymerization, coordination-insertion ring-opening polymerization, and the like.

The term "click chemistry" as used herein refers to chemistry tailored to generate substances quickly and reliably by joining small units together. The reactions in click chemistry generally give high chemical yields, and generally generate inoffensive byproducts. Click chemistry can have simple reaction conditions, use readily available starting materials and reagents, use no solvent or use a solvent that is benign or easily removed (such as water), and can provide simple product isolation by non-chromatographic methods (e.g. crystallization or distillation).

The term "copolymer" as used herein refers to a polymer derived from two (or more) monomeric species, as opposed to homopolymer where only one monomer is used. A copolymer can include sections that are homopolymers. Copolymerization can refer to methods used to chemically synthesized a copolymer.

The term "homopolymer" as used herein refers to a polymer derived from one monomeric species.

Description

The present invention relates to polymers, nanomaterials, and methods of making the same. Various embodiments provide an amphiphilic multi-arm copolymer. The copolymer includes a core unit (e.g. macro-initiator) and a plurality of amphiphilic block copolymer arms. Each block copolymer arm is substituted on the core unit. Each block copolymer arm includes at least one hydrophilic homopolymer subunit and at least one hydrophobic homopolymer subunit. In some examples, the copolymer can include a star-like or bottle-brush-like block copolymer. Various embodiments provide a nanomaterial. The amphiphilic multi-arm copolymer can serve as a template for making the nanomaterial. In some examples, the nanomaterial can include Janus nanomaterials, and can include nanoparticles, nanorods, or nanotubes. The nanomaterial includes the amphiphilic multi-arm copolymer template and at least one inorganic precursor. The inorganic precursor can be coordinated to at least one homopolymer subunit of one of the amphiphilic block copolymer arms to form the nanomaterial. Various embodiments also provide methods of making the copolymer and the nanomaterial.

Amphiphilic Multi-Arm Copolymer

Various embodiments of the present invention provide an amphiphilic multi-arm copolymer. The copolymer includes a core unit. The copolymer also includes a plurality of amphiphilic block copolymer arms. Each block copolymer arm is substituted on the core unit. Each block copolymer includes at least one hydrophilic homopolymer subunit and at least one hydrophobic homopolymer subunit. In some embodiments, the amphiphilic multi-arm copolymer can serve as a template for the formation of nanomaterials.

The core unit can be any appropriate core unit. The core unit can be a single molecule. The core unit can be a large molecule that includes several smaller molecules linked together. The core unit can include any suitable number of locations that can be substituted by the amphiphilic block copolymer arms. In some examples, the core unit includes about 1, 2, 3, 4, 5, 10, 20, 30, 40, or about 50 or more locations that can be substituted with arms. In the copolymer, the core can be substituted at one of the substitutable locations, at all of the substitutable locations, or at any number of the substitutable locations, with the amphiphilic block copolymer arms. In a given molecule of the amphiphilic multi-arm copolymer, the copolymer can include core units that have copolymer-substitutable locations, wherein some of the substitutable locations are substituted by other moieties, wherein some of the substitutable locations are not substituted by any substituent, or wherein all of the substitutable locations are substituted by an amphiphilic block copolymer. The copolymer can include core units that are substituted at some substitutable locations with an amphiphilic block copolymer arm, and at other substitutable locations with a different polymer, such as a non-amphiphilic copolymer. The copolymer can include core units that are substituted by different amphiphilic block copolymers, wherein any suitable proportion of various amphiphilic block copolymers can be used.

In some examples, the core unit is a cyclodextrin, for example a beta-cyclodextrin (β-CD). In some examples, the location of the core that can be substituted by the amphiphilic block copolymer arms can be a hydroxyl-group, wherein the substituted hydroxyl has an amphiphilic block copolymer arm substituted in place of the hydrogen atom of the hydroxyl group. For example, an unsubstituted β-CD can have 21 hydroxyl groups that can be substituted by an amphiphilic block copolymer arm. In some examples, not all hydroxyl groups of the β-CD are substituted by an amphiphilic block copolymer arm. In some examples, the substituted hydroxyl groups can have different amphiphilic block copolymer arms, differing in chain length, amphiphilicity, type of homopolymer subunit, of type of chemical functionality that begins or ends the block copolymer arm. In other examples, all hydroxyl groups of the β-CD are substituted by a similar amphiphilic block copolymer arm, wherein the chain lengths are the same or similar, and wherein the type of homopolymer subunit is similar or identical for each block copolymer arm, and wherein the type of chemical functionality that begins or ends the block copolymer arm is identical or similar.

The core unit can include several core subunit molecules linked together. In some examples, the core subunit can be any core unit as described above, wherein the core subunit can be linked to another core subunit via a chemical linkage. The core subunit molecules can be the same or different, and can be linked together in any suitable pattern or arrangement. Differing arrangements and types of subunits can lead to different properties of copolymers and nanomaterials formed therefrom. The chemical linkage can be any suitable chemical linkage, for example, an alkyl group, an alkoxy group, or a polymer that includes alkyleneoxide units. In one example, the linkage is a polyethylene oxide linkage, also referred to as a polyethylene glycol linkage. The linkages can be substituted at any location on the core subunits. In one example, the linkages are substituted at locations on the core subunits that are substitutable with amphiphilic block copolymers. Any number of linkages can be used per core subunit, provided that at least one substitutable location on the full core unit (e.g. all subunits combined) can be substituted with an amphiphilic block copolymer arm. In some examples, about 0%, 1%, 2%, 5%, 10%, 20%, 50%, 80%, 90%, or about 100% of a particular core subunit's amphiphilic copolymer-substitutable locations can be substituted with linkage units. In some examples, the percent of linkage-substituted locations of one core subunit can be the same or different than the percent of linkage-substituted locations on another core subunit.

For example, the core unit can include multiple β-CD core subunit molecules that are linked together to form a single core unit molecule. The β-CD can be linked together to form a tubular structure. Any proportion of the total core unit structure can be a tubular structure, while the remaining proportion of the total core unit can be another structure. Any suitable number of β-CD molecules can be liked together to form a tubular structure. For example, about 2, 3, 4, 5, 10, 20, 50, 100, 500, 1000, 5000, 10,000, 20,000, or about 50,000 or more β-CD can be linked together to form a single molecule that can be the core unit of the copolymer, including linked together in a tubular fashion. In one example, one or more ethylene oxide units can form the linkages between the β-CD core subunits. The linkages can be substituted at hydroxyl-groups which, if not substituted with linkages, could be substituted with amphiphilic copolymer arms. In some examples, due to the substitution with linkages, all 21 hydroxyl groups of the β-CD core subunits may not be available for substitution by an amphiphilic block copolymer.

In some examples, the amphiphilic block copolymer arm can include at least one linking unit between the homopolymer subunits of the block copolymer and the core unit of the amphiphilic multi-arm copolymer molecule. The linking unit can be any suitable linking unit that allows the core unit to be substituted with the amphiphilic block copolymer. For example, the linking unit can include an acylalkyl group. In some examples, the linking unit can include a 2,2-dimethylacetyl group. In some embodiments, an acyl group on the linking unit can form an ester-linkage with hydroxyl groups on the core unit. In some embodiments, substitution of the amphiphilic block copolymer arm onto the unit core includes substitution of a 2,2-dimethylacetyl group on an oxygen atom of the unit core, wherein the substituted oxygen atom can be a hydroxyl group in the unsubstituted unit core, wherein the at least one hydrophilic homopolymer subunit or the at least one hydrophobic homopolymer subunit of the amphiphilic block copolymer arm is a substituent at the 2-position of the 2,2-dimethylacetyl group, wherein the acetyl group of the 2,2-dimethylacetyl group forms a ester-linkage with the substituted oxygen atom of the unit core. In some embodiments, substitution of the amphiphilic block copolymer arm onto a β-CD unit core has the following structure:

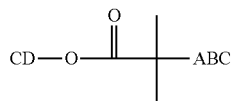

wherein CD-O represents the substituted beta-cyclodextrin unit, O represents an oxygen atom that includes a hydroxyl group in an unsubstituted beta-cyclodextrin molecule, and ABC represents the at least one hydrophilic homopolymer and the at least one hydrophobic homopolymer of the copolymer arm.

Each amphiphilic block copolymer in a given amphiphilic multi-arm copolymer molecule can be the same, similar, or different, for example with regard to chain length of individual homopolymer subunits, types of homopolymer subunits, functionality that begins or ends the amphiphilic block copolymer arm, or with regard to other features. An amphiphilic block copolymer arm can include at least one hydrophilic homopolymer subunit and at least one hydrophobic homopolymer subunit. In descriptions of hydrophobicity and hydrophilicity, in some examples the terms are not mutually exclusive. In other examples, they are mutually exclusive. For example, a hydrophobic subunit can have some hydrophilic character, wherein it is predominantly or at least partially hydrophobic but also at least partially hydrophilic, such that it can be classified as either hydrophobic or hydrophilic. In other examples, a hydrophobic subunit can have little enough hydrophilic character that one of skill in the art would not normally classify the subunit as hydrophilic. In some examples, a hydrophilic subunit can have some hydrophobic character, wherein it is predominantly or at least partially hydrophilic but also at least partially hydrophobic, such that it can be classified as either hydrophobic or hydrophilic. In other examples, a hydrophilic subunit can have little enough hydrophobic character that one of skill in the art would not normally classify the subunit as hydrophobic.

Amphiphilic block copolymer arms are referred to as amphiphilic and as having at least one hydrophobic homopolymer subunit and at least one hydrophilic homopolymer subunit to mean that at least one of the homopolymer subunits of the arm is predominantly hydrophobic, and that at least one of the homopolymer subunits of the arm is predominantly hydrophilic. In some examples, the at least one hydrophobic homopolymer subunit of the amphiphilic block copolymer arm has enough hydrophilic character that it could be reasonably also be classified as hydrophilic, whereas in other examples, the hydrophobic homopolymer subunit has little enough hydrophilic character that it would not normally be characterized as hydrophilic; however, the at least one hydrophobic homopolymer subunit of the amphiphilic copolymer arm is predominantly hydrophobic. In some examples, the at least one hydrophilic homopolymer subunit of the amphiphilic block copolymer arm has enough hydrophobic character that it could reasonably also be classified as hydrophobic, whereas in other examples, the hydrophilic homopolymer subunit has little enough hydrophobic character that it would not normally be characterized as hydrophobic; however, the at least one hydrophilic homopolymer subunit of the amphiphilic copolymer arm is predominantly hydrophilic.

In some examples, the repeating units of each homopolymer arm on a particular copolymer molecule can be in the same or a similar repeating units, and can be in the same or a similar order. In other examples, the repeating units of some homopolymers on a particular copolymer molecule can be different, or can be in a different order. Each homopolymer subunit of each block copolymer arm can include any suitable number of repeating units. For example, a homopolymer subunit can include about 1, 2, 3, 4, 5, 10, 20, 40, 60, 80, 100, 500, 1000, 5000, 10,000, 20,000, 50,000, 100,000, 500,000, or about 1,000,000 repeating units. Each copolymer arm on a particular copolymer molecule can have the same or about the same number of a particular repeating unit. Alternatively, some of the copolymer arms can have different numbers of a particular repeating unit. The similarly or difference of the identity, number, or order of repeating units in the arms of a particular copolymer molecule, can be adjusted to effect the desired properties from the copolymer molecule or from nanomaterials that can be formed therefrom.

In some examples, the at least one hydrophobic homopolymer subunit of the amphiphilic block copolymer arm can include any suitable hydrophobic homopolymer subunit. For example, the at least one hydrophobic homopolymer subunit of the amphiphilic block copolymer arm can include poly (alkenylaryl) units such as, for example, polystyrene (PS) units, poly(alkenylheteroaryl) units such as, for example, poly(4-vinylpyridine) (P4VP) units, or poly(lactam) units such as, for example, polycaprolactam (PCL) units.

In some examples, the at least one hydrophilic homopolymer subunit of the amphiphilic block copolymer arm can include any suitable hydrophilic homopolymer subunit. For example, the at least one hydrophilic homopolymer subunit of the amphiphilic block copolymer arm can include poly (alkyl alkenoate) units such as, for example, poly(t-butyl acrylate) (PtBA) units, poly(alkenoic acid) units such as poly (acrylic acid) (PAA) units, or poly(alkylene oxide) units such as poly(ethylene oxide) (PEO) units. In some examples, the hydrophilic functional homopolymer subunit can be any subunit that can coordinate to an inorganic precursor. In some examples, the hydrophilic homopolymer subunit can be derived chemically from a different homopolymer subunit. In some examples, the chemical derivation can occur after the homopolymer subunit has been installed on the multi-arm amphiphilic copolymer. In some examples, the hydrophilic homopolymer subunit can be derived chemically from a hydrophilic homopolymer subunit, whereas in other examples, the hydrophilic homopolymer subunit can be derived chemically from a hydrophobic homopolymer subunit.

In various embodiments, amphiphilic block copolymer arms include any suitable amphiphilic block copolymer. For example, the block copolymer arm can include at least two homopolymer subunits. For example, the amphiphilic block copolymer arms can include a hydrophilic homopolymer subunit nearest the core, followed by a hydrophobic homopolymer subunit. For example, the amphiphilic block copolymer arms can include poly(alkyl alkenoate)-b-poly(alkenylaryl) such as, for example, PtBA-b-PA, poly(alkyl alkenoate)-b-poly(alkenylheteroaryl) such as, for example, PtBA-b-P4VP, poly(alkyl alkenoate)-b-poly(lactam) such as, for example, PtBA-b-PCL, poly(alkenoic acid)-b-poly(alkenylaryl) such as, for example, PAA-b-PS, poly(alkenoic acid)-b-poly(alkenylheteroaryl) such as, for example, PAA-b-P4VP, poly(alkenoic acid)-b-poly(lactam) such as, for example, PAA-b-PCL, poly(alkylene oxide)-b-poly(alkenylaryl) such as, for example, PEO-b-PS, poly(alkylene oxide)-b-poly(alkenylheteroaryl) such as, for example, PEO-b-P4VP, or poly(alkylene oxide)-b-poly(lactam) such as, for example, PEO-b-PCL. In another example, the amphiphilic block copolymer arms can include a hydrophobic homopolymer subunit nearest the core, followed by a hydrophilic homopolymer subunit. For example, poly(alkenylaryl)-b-poly(alkyl alkenoate) such as, for example, PS-b-PtBA, poly(alkenylaryl)-b-poly(alkenoic acid) such as, for example, PS-b-PAA, poly(alkenylaryl)-b-poly(alkylene oxide) such as, for example, PS-b-PEO, poly(alkenylheteroaryl)-b-poly(alkyl alkenoate) such as, for example, P4VP-b-PtBA, poly(alkenylheteroaryl)-b-poly(alkenoic acid) such as, for example, P4VP-b-PAA, poly (alkenylheteroaryl)-b-poly(alkylene oxide) such as, for example, P4VP-b-PEO, poly(lactam)-b-poly(alkyl alkenoate) such as, for example, PCL-b-PtBA, poly(lactam)-b-poly(alkenoic acid) such as, for example, PCL-b-PAA, or poly(lactam)-b-poly(alkylene oxide) such as, for example, PCL-b-PEO.

In some examples, the block copolymer arm can include at least three homopolymer subunits. For example, the block copolymer arm can include a hydrophilic homopolymer subunit nearest the core, followed by a hydrophobic homopolymer subunit, followed by a hydrophilic homopolymer subunit. For example, the amphiphilic block copolymer arm can include poly(alkyl alkenoate)-b-poly(alkenylaryl)-b-poly (alkyl alkenoate), such as, for example, PtBA-b-PS-b-PtBA, poly(alkyl alkenoate)-b-poly(alkenylaryl)-b-poly(alkenoic acid), such as, for example, PtBA-b-PS-b-PAA, poly(alkyl alkenoate)-b-poly(alkenylaryl)-b-poly(alkylene oxide), such as, for example, PtBA-b-PS-b-PEO, poly(alkyl alkenoate)-b-poly(alkenylheteroaryl)-b-poly(alkyl alkenoate), such as, for example, PtBA-b-P4VP-b-PtBA, poly(alkyl alkenoate)-b-poly(alkenylheteroaryl)-b-poly(alkenoic acid), such as, for example, PtBA-b-P4VP-b-PAA, poly(alkyl alkenoate)-b-poly(alkenylheteroaryl)-b-poly(alkylene oxide), such as, for example, PtBA-b-P4VP-b-PEO, poly(alkyl alkenoate)-b-poly(lactam)-b-poly(alkyl alkenoate), such as, for example, PtBA-b-PCL-b-PtBA, poly(alkyl alkenoate)-b-poly(lactam)-b-poly(alkenoic acid), such as, for example, PtBA-b-PCL-b-PAA, poly(alkyl alkenoate)-b-poly(lactam)-b-poly(alkylene oxide), such as, for example, PtBA-b-PCL-b-PEO, poly(alkenoic acid)-b-poly(alkenylaryl)-b-poly(alkyl alkenoate), such as, for example, PAA-b-PS-b-PtBA, poly(alkenoic acid)-b-poly(alkenylaryl)-b-poly(alkenoic acid), such as, for example, PAA-b-PS-b-PAA, poly(alkenoic acid)-b-poly(alkenylaryl)-b-poly(alkylene oxide), such as, for example, PAA-b-PS-b-PEO, poly(alkenoic acid)-b-poly(alkenylheteroaryl)-b-poly(alkyl alkenoate), such as, for example, PAA-b-P4VP-b-PtBA, poly(alkenoic acid)-b-poly(alkenylheteroaryl)-b-poly(alkenoic acid), such as, for example, PAA-b-P4VP-b-PAA, poly(alkenoic acid)-b-poly(alkenylheteroaryl)-b-poly (alkylene oxide), such as, for example, PAA-b-P4VP-b-PEO, poly(alkenoic acid)-b-poly(lactam)-b-poly(alkyl alkenoate), such as, for example, PAA-b-PCL-b-PtBA, poly(alkenoic acid)-b-poly(lactam)-b-poly(alkenoic acid), such as, for example, PAA-b-PCL-b-PAA, poly(alkenoic acid)-b-poly (lactam)-b-poly(alkylene oxide), such as, for example, PAA-b-PCL-b-PEO, poly(alkylene oxide)-b-poly(alkenylaryl)-b-poly(alkyl alkenoate), such as, for example, PEO-b-PS-b-PtBA, poly(alkylene oxide)-b-poly(alkenylaryl)-b-poly (alkenoic acid), such as, for example, PEO-b-PS-b-PAA, poly (alkylene oxide)-b-poly(alkenylaryl)-b-poly(alkylene oxide), such as, for example, PEO-b-PS-b-PEO, poly(alkylene oxide)-b-poly(alkenylheteroaryl)-b-poly(alkyl alkenoate), such as, for example, PEO-b-P4VP-b-PAA, poly (alkylene oxide)-b-poly(alkenylheteroaryl)-b-poly(alkenoic acid), such as, for example, PEO-b-P4VP-b-PAA, poly(alkylene oxide)-b-poly(alkenylheteroaryl)-b-poly(alkylene oxide), such as, for example, PEO-b-P4VP-b-PEO, poly (alkylene oxide)-b-poly(lactam)-b-poly(alkyl alkenoate), such as, for example, PEO-b-PCL-b-PtBA, poly(alkylene oxide)-b-poly(lactam)-b-poly(alkenoic acid), such as, for example, PEO-b-PCL-b-PtBA, or poly(alkylene oxide)-b-poly(lactam)-b-poly(alkylene oxide), such as, for example, PEO-b-PCL-b-PEO For example, the block copolymer arm can include at least three homopolymer subunits, with a hydrophilic homopolymer subunit nearest the core, followed by a hydrophilic homopolymer subunit, followed by a hydrophobic homopolymer subunit. For example, the amphiphilic block copolymer arm can include poly(alkyl alkenoate)-b-poly(alkenoic acid)-b-poly(alkenylaryl), such as, for example, PtBAb-PAA-b-PS, poly(alkyl alkenoate)-b-poly(alkenoic acid)-b-poly(alkenylheteroaryl), such as, for example, PtBA-b-PAA-b-P4VP, poly(alkyl alkenoate)-b-poly(alkenoic acid)-b-poly (lactam), such as, for example, PtBA-b-PAA-b-PCL, poly (alkyl alkenoate)-b-poly(alkylene oxide)-b-poly (alkenylaryl), such as, for example, PtBA-b-PEO-b-PS, poly (alkyl alkenoate)-b-poly(alkylene oxide)-b-poly (alkenylheteroaryl), such as, for example, PtBA-b-PEO-b-P4VP, poly(alkyl alkenoate)-b-poly(alkylene oxide)-b-poly (lactam), such as, for example, PtBA-b-PEO-b-PCL, poly (alkenoic acid)-b-poly(alkyl alkenoate)-b-poly(alkenylaryl), such as, for example, PAA-b-PtBA-b-PS, poly(alkenoic acid)-b-poly(alkyl alkenoate)-b-poly(alkenylheteroaryl), such as, for example, PAA-b-PtBA-b-P4VP, poly(alkenoic acid)-b-poly(alkyl alkenoate)-b-poly(lactam), such as, for example, PAA-b-PtBA-b-PCL, poly(alkenoic acid)-b-poly (alkylene oxide)-b-poly(alkenylaryl), such as, for example, PAA-b-PEO-b-PS, poly(alkenoic acid)-b-poly(alkylene oxide)-b-poly(alkenylheteroaryl), such as, for example, PAA-b-PEO-b-P4VP, poly(alkenoic acid)-b-poly(alkylene oxide)-b-poly(lactam), such as, for example, PAA-b-PEO-b-PCL, poly(alkylene oxide)-b-poly(alkenoic acid)-b-poly (alkenylaryl), such as, for example, PEO-b-PAA-b-PS, poly (alkylene oxide)-b-poly(alkenoic acid)-b-poly (alkenylheteroaryl), such as, for example, PEO-b-PAA-b-P4VP, poly(alkylene oxide)-b-poly(alkenoic acid)-b-poly (lactam), such as, for example, PEO-b-PAA-b-PCL, poly (alkylene oxide)-b-poly(alkyl alkenoate)-b-poly (alkenylaryl), such as, for example, PEO-b-PtBA-b-PS, poly (alkylene oxide)-b-poly(alkyl alkenoate)-b-poly (alkenylheteroaryl), such as, for example, PEO-b-PtBA-b-P4VP, or poly(alkylene oxide)-b-poly(alkyl alkenoate)-b-poly(lactam), such as, for example, PEO-b-PtBA-b-PCL.

For example, the block copolymer arm can include at least three homopolymer subunits, with a hydrophilic homopolymer subunit nearest the core, followed by a hydrophobic homopolymer subunit, followed by a hydrophobic homopolymer subunit. For example, the amphiphilic block copolymer arm can include poly(alkyl alkenoate)-b-poly(alkenylaryl)-b-poly(alkenylheteroaryl), such as, for example, PtBA-b-PS-b-P4VP, poly(alkyl alkenoate)-b-poly(alkenylaryl)-b-poly(lactam), such as, for example, PtBA-b-PS-b-PCL, poly(alkyl alkenoate)-b-poly(alkenylheteroaryl)-b-poly(alkenylaryl), such as, for example, PtBA-b-P4VP-b-PS, poly(alkyl alkenoate)-b-poly(alkenylheteroaryl)-b-poly(lactam), such as, for example, PtBA-b-P4VP-b-PCL, poly(alkyl alkenoate)-b-poly(lactam)-b-poly(alkenylaryl), such as, for example, PtBA-b-PCL-b-PS, poly(alkyl alkenoate)-b-poly (lactam)-b-poly(alkenylheteroaryl), such as, for example, PtBA-b-PCL-b-P4VP, poly(alkenoic acid)-b-poly(alkenylaryl)-b-poly(alkenylheteroaryl), such as, for example, PAA-b-PS-b-P4VP, poly(alkenoic acid)-b-poly(alkenylaryl)-b-poly(lactam), such as, for example, PAA-b-PS-b-PCL, poly (alkenoic acid)-b-poly(alkenylheteroaryl)-b-poly (alkenylaryl), such as, for example, PAA-b-P4VP-b-PS, poly (alkenoic acid)-b-poly(alkenylheteroaryl)-b-poly(lactam), such as, for example, PAA-b-P4VP-b-PCL, poly(alkenoic acid)-b-poly(lactam)-b-poly(alkenylaryl), such as, for example, PAA-b-PCL-b-PS, poly(alkenoic acid)-b-poly(lactam)-b-poly(alkenylheteroaryl), such as, for example, PAA-b-PCL-b-P4VP, poly(alkylene oxide)-b-poly(alkenylaryl)-b-poly(alkenylheteroaryl), such as, for example, PEO-b-PS-b-P4VP, poly(alkylene oxide)-b-poly(alkenylaryl)-b-poly (lactam), such as, for example, PEO-b-PS-b-PCL, poly (alkylene oxide)-b-poly(alkenylheteroaryl)-b-poly (alkenylaryl), such as, for example, PEO-b-P4VP-b-PS, poly (alkylene oxide)-b-poly(alkenylheteroaryl)-b-poly(lactam), such as, for example, PEO-b-P4VP-b-PCL, poly(alkylene oxide)-b-poly(lactam)-b-poly(alkenylheteroaryl), such as, for example, PEO-b-PCL-b-P4VP, or poly(alkylene oxide)-b-poly(lactam)-b-poly(alkenylaryl), such as, for example, PEO-b-PCL-b-PS.

For example, the block copolymer arm can include at least three homopolymer subunits, with a hydrophobic homopolymer subunit nearest the core, followed by a hydrophobic homopolymer subunit, followed by a hydrophilic homopolymer subunit. For example, the amphiphilic block copolymer arm can include poly(alkenylaryl)-b-poly(alkenylheteroaryl)-b-poly(alkyl alkenoate), such as, for example, PS-b-P4VP-b-PtBA, poly(alkenylaryl)-b-poly(alkenylheteroaryl)-b-poly(alkenoic acid), such as, for example, PS-b-P4VP-b-PAA, poly(alkenylaryl)-b-poly(alkenylheteroaryl)-b-poly (alkylene oxide), such as, for example, PS-b-P4VP-b-PEO, poly(alkenylaryl)-b-poly(lactam)-b-poly(alkyl alkenoate), such as, for example, PS-b-PCL-b-PtBA, poly(alkenylaryl)-b-poly(lactam)-b-poly(alkenoic acid), such as, for example, PS-b-PCL-b-PAA, poly(alkenylaryl)-b-poly(lactam)-b-poly (alkylene oxide), such as, for example, PS-b-PCL-b-PEO, poly(alkenylheteroaryl)-b-poly(alkenylaryl)-b-poly(alkyl alkenoate), such as, for example, P4VP-b-PS-b-PtBA, poly (alkenylheteroaryl)-b-poly(alkenylaryl)-b-poly(alkenoic acid), such as, for example, P4VP-b-PS-b-PAA, poly(alkenylheteroaryl)-b-poly(alkenylaryl)-b-poly(alkylene oxide), such as, for example, P4VP-b-PS-b-PEO, poly(alkenylheteroaryl)-b-poly(lactam)-b-poly(alkyl alkenoate), such as, for example, P4VP-b-PCL-b-PtBA, poly(alkenylheteroaryl)-b-poly(lactam)-b-poly(alkenoic acid), such as, for example, P4VP-b-PCL-b-PAA, poly(alkenylheteroaryl)-b-poly(lactam)-b-poly(alkylene oxide), such as, for example, P4VP-b-PCL-b-PEO, poly(lactam)-b-poly(alkenylaryl)-b-poly(alkyl alkenoate), such as, for example, PCL-b-PS-b-PtBA, poly (lactam)-b-poly(alkenylaryl)-b-poly(alkenoic acid), such as, for example, PCL-b-PS-b-PtBA, poly(lactam)-b-poly(alkenylaryl)-b-poly(alkylene oxide), such as, for example, PCL-b-PS-b-PEO, poly(lactam)-b-poly(alkenylheteroaryl)-b-poly(alkyl alkenoate), such as, for example, PCL-b-P4VP-b-PtBA, poly(lactam)-b-poly(alkenylheteroaryl)-b-poly (alkenoic acid), such as, for example, PCL-b-P4VP-b-PAA, or poly(lactam)-b-poly(alkenylheteroaryl)-b-poly(alkylene oxide), such as, for example, PCL-b-P4VP-b-PEO.

For example, the block copolymer arm can include at least three homopolymer subunits, with a hydrophobic homopolymer subunit nearest the core, followed by a hydrophilic homopolymer subunit, followed by a hydrophobic homopolymer subunit. For example, the amphiphilic block copolymer arm can include poly(alkenylaryl)-b-poly(alkenoic acid)-b-poly(alkenylaryl), such as, for example, PS-b-PAA-b-PS, poly(alkenylaryl)-b-poly(alkenoic acid)-b-poly (alkenylheteroaryl), such as, for example, PS-b-PAA-b-P4VP, poly(alkenylaryl)-b-poly(alkenoic acid)-b-poly (lactam), such as, for example, PS-b-PAA-b-PCL, poly (alkenylaryl)-b-poly(alkyl alkenoate)-b-poly(alkenylaryl), such as, for example, PS-b-PtBA-b-PS, poly(alkenylaryl)-b-poly(alkyl alkenoate)-b-poly(alkenylheteroaryl), such as, for example, PS-b-PtBA-b-P4VP, poly(alkenylaryl)-b-poly (alkyl alkenoate)-b-poly(lactam), such as, for example, PS-b-PtBA-b-PCL, poly(alkenylaryl)-b-poly(alkylene oxide)-b-poly(alkenylaryl), such as, for example, PS-b-PEO-b-PS, poly(alkenylaryl)-b-poly(alkylene oxide)-b-poly(alkenylheteroaryl), such as, for example, PS-b-PEO-b-P4VP, poly (alkenylaryl)-b-poly(alkylene oxide)-b-poly(lactam), such as, for example, PS-b-PEO-b-PCL, poly(alkenylheteroaryl)-b-poly(alkenoic acid)-b-poly(alkenylaryl), such as, for example, P4VP-b-PAA-b-PS, poly(alkenylheteroaryl)-b- poly(alkenoic acid)-b-poly(alkenylheteroaryl), such as, for example, P4VP-b-PAA-b-P4VP, poly(alkenylheteroaryl)-b-poly(alkenoic acid)-b-poly(lactam), such as, for example, P4VP-b-PAA-b-PCL, poly(alkenylheteroaryl)-b-poly(alkyl alkenoate)-b-poly(alkenylaryl), such as, for example, P4VP-b-PtBA-b-PS, poly(alkenylheteroaryl)-b-poly(alkyl alkenoate)-b-poly(alkenylheteroaryl), such as, for example, P4VP-b-PtBA-b-P4VP, poly(alkenylheteroaryl)-b-poly(alkyl alkenoate)-b-poly(lactam), such as, for example, P4VP-b-PtBA-b-PCL, poly(alkenylheteroaryl)-b-poly(alkylene oxide)-b-poly(alkenylaryl), such as, for example, P4VP-b-PEO-b-PS, poly(alkenylheteroaryl)-b-poly(alkylene oxide)-b-poly(alkenylheteroaryl), such as, for example, P4VP-b-PEO-b-P4VP, poly(alkenylheteroaryl)-b-poly(alkylene oxide)-b-poly(lactam), such as, for example, P4VP-b-PEO-b-PCL, poly(lactam)-b-poly(alkenoic acid)-b-poly(alkenylaryl), such as, for example, PCL-b-PAA-b-PS, poly(lactam)-b-poly(alkenoic acid)-b-poly(alkenylheteroaryl), such as, for example, PCL-b-PAA-b-P4VP, poly(lactam)-b-poly(alkenoic acid)-b-poly(lactam), such as, for example, PCL-b-PAA-b-PCL, poly(lactam)-b-poly(alkyl alkenoate)-b-poly(alkenylaryl), such as, for example, PCL-b-PtBA-b-PS, poly(lactam)-b-poly(alkyl alkenoate)-b-poly(alkenylheteroaryl), such as, for example, PCL-b-PtBA-b-P4VP, poly(lactam)-b-poly(alkyl alkenoate)-b-poly(lactam), such as, for example, PCL-b-PtBA-b-PCL, poly(lactam)-b-poly(alkylene oxide)-b-poly(alkenylaryl), such as, for example, PCL-b-PEO-b-PS, poly(lactam)-b-poly(alkylene oxide)-b-poly(alkenylheteroaryl), such as, for example, PCL-b-PEO-b-P4VP, or poly(lactam)-b-poly(alkylene oxide)-b-poly(lactam), such as, for example, PCL-b-PEO-b-PCL.

For example, the block copolymer arm can include at least three homopolymer subunits, with a hydrophobic homopolymer subunit nearest the core, followed by a hydrophilic homopolymer subunit, followed by a hydrophilic homopolymer subunit. For example, the amphiphilic block copolymer arm can include poly(alkenylaryl)-b-poly(alkenoic acid)-b-poly(alkyl alkenoate), such as, for example, PS-b-PAA-b-PtBA, poly(alkenylaryl)-b-poly(alkenoic acid)-b-poly(alkylene oxide), such as, for example, PS-b-PAA-b-PEO, poly(alkenylaryl)-b-poly(alkyl alkenoate)-b-poly(alkenoic acid), such as, for example, PS-b-PtBA-b-PAA, poly(alkenylaryl)-b-poly(alkyl alkenoate)-b-poly(alkylene oxide), such as, for example, PS-b-PtBA-b-PEO, poly(alkenylaryl)-b-poly(alkylene oxide)-b-poly(alkyl alkenoate), such as, for example, PS-b-PEO-b-PtBA, poly(alkenylaryl)-b-poly(alkylene oxide)-b-poly(alkenoic acid), such as, for example, PS-b-PEO-b-PAA, poly(alkenylheteroaryl)-b-poly(alkenoic acid)-b-poly(alkyl alkenoate), such as, for example, P4VP-b-PAA-b-PtBA, poly(alkenylheteroaryl)-b-poly(alkenoic acid)-b-poly(alkylene oxide), such as, for example, P4VP-b-PAA-b-PEO, poly(alkenylheteroaryl)-b-poly(alkyl alkenoate)-b-poly(alkenoic acid), such as, for example, P4VP-b-PtBA-b-PAA, poly(alkenylheteroaryl)-b-poly(alkyl alkenoate)-b-poly(alkylene oxide), such as, for example, P4VP-b-PtBA-b-PEO, poly(alkenylheteroaryl)-b-poly(alkylene oxide)-b-poly(alkyl alkenoate), such as, for example, P4VP-b-PEO-b-PtBA, poly(alkenylheteroaryl)-b-poly(alkylene oxide)-b-poly(alkenoic acid), such as, for example, P4VP-b-PEO-b-PAA, poly(lactam)-b-poly(alkenoic acid)-b-poly(alkyl alkenoate), such as, for example, PCL-b-PAA-b-PtBA, poly(lactam)-b-poly(alkenoic acid)-b-poly(alkylene oxide), such as, for example, PCL-b-PAA-b-PEO, poly(lactam)-b-poly(alkyl alkenoate)-b-poly(alkenoic acid), such as, for example, PCL-b-PtBA-b-PAA, poly(lactam)-b-poly(alkyl alkenoate)-b-poly(alkylene oxide), such as, for example, PCL-b-PtBA-b-PEO, poly(lactam)-b-poly(alkylene oxide)-b-poly(alkyl alkenoate), such as, for example, PCL-b-PEO-b-PtBA, or poly(lactam)-b-poly(alkylene oxide)-b-poly(alkenoic acid), such as, for example, PCL-b-PEO-b-PAA.

In some examples, the block copolymer arms of the copolymer molecule can include linear block copolymers. In some examples, the block copolymer arms of the copolymer molecule can include graft copolymers (e.g. polymer side chains). The graft copolymer can include side chains that include any repeating unit disclosed herein. For example, the graft copolymer side chains can include hydrophobic subunits such as poly(alkenylaryl) units such as, for example, polystyrene (PS) units, poly(alkenylheteroaryl) units such as, for example, poly(4-vinylpyridine) (P4VP) units, or poly(lactam) units such as, for example, polycaprolactam (PCL) units; or hydrophilic units such as poly(alkyl alkenoate) units such as, for example, poly(t-butyl acrylate) (PtBA) units, poly(alkenoic acid) units such as poly(acrylic acid) (PAA) units, or poly(alkylene oxide) units such as poly(ethylene oxide) (PEO) units.

In some examples, the block copolymer arms can include any suitable chemical functionality as the end-group of the block copolymer arms, e.g. as the chemical group opposite the core molecule on the block copolymer arm. In some examples, the end-group of the block copolymer arms can be the same, similar, or different. In some examples, the end-group of the block copolymer arms can be an azide group (e.g. —$N_3$). The end-group can allow for any suitable further chemical reactions, which can occur before, during, or after addition of an inorganic precursor to form a nanomaterial; in some embodiments no precursor is added and the copolymer molecule is desired. In some examples, the end group allows click chemistry to occur. For example, an azide group can allow a Huisgen 1,3-dipolar cycloaddition between an azide and a terminal or internal alkyne to give a 1,2,3-triazole. Any suitable end-group can be used, to allow for any suitable reaction to take place later, or allow for any desired functionality on the surface of or inside of a resulting nanomaterial.

In some examples, the homopolymer sections of the block copolymer arms can be connected directly to one another. In other examples, the homopolymer sections of the block copolymer arms can be connected to one another via any suitable linking unit. One example of a suitable linking unit between homopolymer sections of the block copolymer arms is a 1,2,3-triazole ring that connects one polymer subunit end-unit of one homopolymer section to one polymer subunit end-unit of another homopolymer section, via the 1- and 4-positions of the heterocycle. As described above and below, such a heterocyclic linking unit can be formed using a Huisgen 1,3-dipolar cycloaddition between an azide and a terminal or internal alkyne, an example of click chemistry.

Method of Making an Amphiphilic Multi-Arm Copolymer

Various embodiments of the present invention provide a method for making an amphiphilic multi-arm copolymer. The method can generate any amphiphilic multi-arm copolymer described herein. The method can be any suitable method that generates any amphiphilic multi-arm copolymer described herein. The method can include contacting a core with a series of polymer subunits, to form a core that is substituted with block copolymer arms, wherein the block copolymer arms are amphiphilic. The core can be any suitable core, and the block copolymer arms can be any suitable block copolymer arms that are amphiphilic. A variety of polymeric shapes can be synthesized using the method, including star-like, and bottle-brush. The method can be used to make Janus polymers. The method can allow production of polymers with well-designed molecular structures, different functional blocks, highly controllable molecular weight, uniform size, and varied ratio of functional blocks. Any suitable polymerization method can be used, and it is to be understood that the method of the present invention is not limited to any of the specific examples of polymerization given herein. The method generally includes living polymerization, for example, atom transfer radical polymerization (ATRP), reversible addition-fragmentation chain-transfer (RAFT) polymerization, anionic polymerization, or coordination-insertion ring-opening polymerization).

The method can also include the use of click chemistry. An example of click chemistry can include a cyclization reaction between an azide group on the end of one polymer subunit and alkyne group on the end of another polymer subunit to give a 1,2,3-triazole ring that connects one polymer subunit to the other via the 1- and 4-positions of the heterocycle. An example is illustrated in FIG. 1. FIG. 1 illustrates the synthesis of a star-like PAA-b-PEO amphiphilic multi-arm copolymer via a combination of ATRP and click chemistry. First, a 21-arm star-like PtBA polymer with azide end-groups (PtBA-$N_3$) can be prepared via the reaction of a star-like PtBA polymer with a bromine end-group (PtBA-Br) with sodium azide. A propargyl group can be introduced to a polyethyleneoxide (PEO) chain-end by a nucleophilic substitution reaction between the active hydroxyl end group of the PEO and propargyl bromide, giving an alkyne-terminated PEO. Finally, a reaction between an azide end-group of PtBA and the alkenyl end-group of the PEO gives click chemistry to link the azide and alkenyl groups together via 1,2,3-triazole units, giving a PtBA-b-PEO 21-arm star-like block copolymer. The final product, a star-like PAA-b-PEO, can be obtained via the hydrolysis of PtBA block in TFA.

In some examples, the method includes providing a core that includes hydroxyl functional groups. The method can include contacting the core with a halogenated esterification reagent. The contacting gives a macro-initiator core that includes the core with at least some of the hydroxyl functional groups esterified by the halogenated esterification reagent. The method can include contacting the macro-initiator core with a first homopolymer subunit precursor. The contacting of the macro-initiator core can give a first substituted core. The first substituted core includes the macro-initiator core wherein at least one halogen atom on the core (e.g. the halogen atom that came from the halogenated esterification reagent) is replaced with a first homopolymer includes subunits that include a reaction product of the first homopolymer subunit precursor. The method can include contacting the first substituted core with a second homopolymer subunit precursor. The second homopolymer subunit precursor is different from the first homopolymer subunit precursor. The contacting gives a second substituted core that includes the first substituted core, wherein the first homopolymer is substituted with a second homopolymer that includes subunits that include a reaction product of the second homopolymer precursor. The first and second homopolymer together include an amphiphilic block copolymer arm.

The core unit can be any appropriate core unit. The core unit can be a single molecule. The core unit can be a large molecule that includes several smaller molecules linked together. The core unit can include any suitable number of locations that can be substituted by the amphiphilic block copolymer arms. In some examples, the core unit includes about 1, 2, 3, 4, 5, 10, 20, 30, 40, or about 50 or more locations that can be substituted with arms. In some examples, the core unit is a cyclodextrin, for example a beta-cyclodextrin (β-CD). For example, an unsubstituted β-CD can have 21 hydroxyl groups that can be substituted by an amphiphilic block copolymer arm. In some examples, not all hydroxyl groups of the β-CD are substituted by an amphiphilic block copolymer arm. In some examples, the substituted hydroxyl groups can have different amphiphilic block copolymer arms, differing in chain length, amphiphilicity, type of homopolymer subunit, of type of chemical functionality that begins or ends the block copolymer arm. In other examples, all hydroxyl groups of the β-CD are substituted by a similar amphiphilic block copolymer arm, wherein the chain lengths are the same or similar, and wherein the type of homopolymer subunit is similar or identical for each block copolymer arm, and wherein the type of chemical functionality that begins or ends the block copolymer arm is identical or similar.

The halogenated esterification reagent can be any suitable reagent that has a halogen substituent and that can form an ester with a hydroxyl group. For example, a halogenated carboxylic acid can be a halogenated esterification reagent. The halogenated carboxylic acid can be any carboxylic acid, including an alkanoic, alkenoic, or alkynoic acid, with any degree or branching, that includes a halogen substituent. In some examples, the halogenated esterification reagent can be 2-bromoisobutyryl bromide.

In some embodiments, the method can further include contacting the second substituted core with a third homopolymer subunit precursor. The third homopolymer subunit precursor is different from the second homopolymer subunit precursor. The contacting gives a third substituted core that includes the second substituted core wherein the second homopolymer is substituted with a third homopolymer that includes subunits that include a reaction product of the third homopolymer subunit precursor.

The first homopolymer subunit precursor, the second homopolymer subunit precursor, and the third homopolymer subunit precursor, or any other homopolymer subunit precursor, can be any suitable homopolymer precursor. For example, the homopolymer precursor can be an alkyl alkenoate, an alkenoic acid, an alkylene glycol, an alkenylaryl compound, an alkenylheteroaryl compound, or a lactam. A reaction product of an alkyl alkenoate subunit precursor can include, for example, alkyl alkylenoate subunits. A reaction product of an alkenoic acid subunit precursor can include, for example, alkylenoic acid subunits. A reaction product of an alkylene glycol subunit precursor can include, for example, alkylene oxide subunits. A reaction product of an alkenylaryl subunit precursor can include, for example, alkylenylaryl subunits. A reaction product of an alkenylheteroaryl subunit precursor can include, for example, alkylenylheteroaryl subunits. A reaction product of a lactam can include, for example, amide subunits. For example, the homopolymer precursor can be t-butyl acrylate, acrylic acid, ethylene glycol, styrene, 4-vinylpyridine, or caprolactam. A reaction product of t-butyl acrylate can include, for example, t-butyl propylenoate subunits. A reaction product of acrylic acid can include, for example, propylenoic acid subunits. A reaction product of ethylene glycol can include, for example, ethylene oxide subunits. A reaction product of styrene can include, for example, phenylethylene units. A reaction product of 4-vinylpyridine can include, for example, 4-ethylenylpyridine subunits. A reaction product of caprolactam can include, for example, hexanamidylene subunits.

The method can include the use of a suitable solvent during any step. For example, the method can include the use of organic solvents such as 1-methyl-2-pyrrolidione (NMP), methyl ethyl ketone, methylene chloride, tetrahydrofuran (THF), dimethylformamide (DMF).

The method can include the use of variation of temperature. For example, during additions of reagents, the temperature can be kept low to help keep an exothermic reaction under control. In another example, the temperature can be kept low during reactions to control the rate of the reaction, which during polymerization can influence the rate of the reaction. For example, during the polymerization steps, the reaction flask holding the mixture can be immersed in cold liquids, such as liquid nitrogen, in order to slow down or stop the reaction, as desired. In another example, an elevated temperature is used to effect a desired reaction rate or to offset and endothermic chemical reaction.

Various initiators or catalysts can be added to initiate or catalyst polymerization steps. For example, catalyst systems, including for example radical initiator mixtures, can be added during polymerization. For example, cuprous bromide (CuBr) can be used, and N,N,N',N'',N''-pentamethyldiethylene triamine (PMDETA) can be used. Any suitable polymerization initiator or catalyst can be used during polymerization steps.

Various purification steps can occur during the method. For example, standard workup procedures to remove aqueously soluble or insoluble impurities can be used, such as washing with basic aqueous solutions, eluting through silica or alumina columns (for filtration or chromatography) using an appropriate solvent, or filtration through any suitable media using an appropriate solvent.

Drying steps can be included in the method. The drying steps can include removal of water. The drying steps can include the removal of any solvent. The drying can occur under a vacuum, or at ambient pressure. In some examples, drying can occur at low temperature.

In some embodiments, UV-cross linking can be performed on the copolymer. UV cross-linking can be effective to cross link homopolymer subunits including PS, PCL, or PEO subunits. Such cross linking can cause desirable properties to occur in the copolymer, for example enhanced durability or strength, or altered polarity of functional groups.

Nanomaterials

Various embodiments of the present invention provide nanomaterials. The nanomaterial can be any nanomaterial derived from an amphiphilic multi-arm copolymer described herein. The nanomaterial is formed by contacting an inorganic precursor with the amphiphilic multi-arm copolymer. The contacting causes the inorganic precursor to coordinate with homopolymer subunits of the block copolymer arms that have functional groups for coordination, forming the nanomaterial.

By using the appropriate copolymer, for example by using a particular core, or by using a particular pattern or arrangement of block copolymer subunits, or by adjusting the size of the copolymer by using various chain-lengths of the blocks of the copolymer, a wide variety of nanomaterials can be formed. For example, by using a copolymer with coordinatable-homopolymer subunits nearest the core, the nanomaterial can have a core-inorganic portion, with functional organic groups extending from the core-inorganic portion of the nanomaterial. By adjusting the identity of the functional groups extending from the surface, various properties of the nanomaterial can be varied. For example, by using hydrophobic functional groups, the nanomaterial can be made to be organic-solvent soluble. For example, by using hydrophilic functional groups, the nanomaterial can be made to be water soluble. In some embodiments, by using a copolymer with coordinatable-homopolymer subunits separated from the core by one or more non-coordinatable-homopolymer subunits, a nanomaterial can be made that has an inorganic-shell that surrounds an organic core. By using a copolymer that as coordinatable-homopolymer subunits nearest the core, followed by non-coordinatable-homopolymer subunits, followed by coordinatable-subunits, a nanomaterial can be formed that has both an inorganic-core and an inorganic-shell.

The coordination between the coordinatable homopolymer subunits and the coordinating inorganic precursor can be any suitable coordination. In some embodiments, the coordination can include inter-atomic forces that are equivalent to a chemical bond, such as a covalent bond, or an ionic bond. In some embodiments, the coordination can include inter-atomic forces that are not as strong as a covalent bond, but that are strong enough to hold the inorganic precursor compound together with the amphiphilic multi-arm copolymer. In some embodiments, after coordination, the complex can be further treated to cause the inorganic material to fuse together or to undergo a chemical change that causes additional forces other than just the coordination force to hold the inorganic compound together with the copolymer molecule. For example, the nanomaterial can be treated with heat. In another example, the nanomaterial can be chemically treated. Some types of coordinatable-homopolymer subunits can be coordinated more strongly with particular kinds of inorganic precursors than others; any post-coordination treatment that occurs can be dependent on the strength of this interaction. In some examples, the nanomaterial undergoes no further treatment, and the coordination of the inorganic precursor with the copolymer molecule is strong enough to allow for the intended use of the nanomaterial. In some examples, the inorganic precursor coordinates to poly(acrylic acid) subunits of the amphiphilic multi-arm copolymer molecule. In some examples, the coordination complex between the one or more inorganic precursors and the copolymer molecule can be considered to be a single molecule.

Method of Making a Nanomaterial

Various embodiments of the present invention provide a method of making a nanomaterial. The nanomaterial can be any suitable nanomaterial described herein. The method of making a nanomaterial can be any suitable method that gives a nanoparticle described herein. The method of making a nanomaterial can include the method of making an amphiphilic multi-armed copolymer described herein, followed by a step of contacting an inorganic precursor molecule with the precursor. In another example, the method of making a nanomaterial includes adding an inorganic precursor molecule to an amphiphilic multi-armed copolymer, wherein the amphiphilic multi-armed copolymer is made or obtained by any suitable method.

The inorganic precursor can be an ion. The inorganic compound can be a neutral species. The inorganic compound can be a metal. The inorganic compound can be a transition metal. The inorganic compound can be any compound that can coordinate to a homopolymer in the amphiphililc multi-armed copolymer.

The inorganic precursor can be formed from an inorganic precursor source. The inorganic precursor source can be any suitable compound or compounds that can generate an inorganic precursor. For precursor sources that include multiple compounds, the compound can be combined prior to contacting with the copolymer molecule, while contacting the copolymer molecule, or after contacting the copolymer molecule. The precursor source can be combined prior to contacting. The inorganic precursor source can be any compound or compounds wherein a part of the precursor source or a compound or species derived from the precursor source is the inorganic precursor. The precursor source can be a compound that chemically affects another compound such that the inorganic precursor is produced. The inorganic precursor source can be a salt. In one example, the salt includes more than one counterion, and less than all the counterions within the salt coordinate to the homopolymer subunit. For example, the inorganic precursor source can be a salt including an Au ion with a counterion, while the resulting coordinating precursor compound can include only the Au ion of the salt. The inorganic precursor source can be any source of a coordinating compound.

In some examples, the inorganic precursor can be any suitable ion, or any suitable molecule, wherein the ion or molecule can coordinate to homopolymer subunits of the amphiphilic multi-arm copolymer. For example, the inorganic precursor can be Au, Ag, Pb, Ba, Na, Tm, Fe, Cd, Ti, Zn, Cu, Sn, or any suitable ion thereof. In some examples, the inorganic precursor can be provided by a compound that includes the inorganic precursor or that undergoes a chemical reaction to provide the inorganic precursor, such as a salt of the inorganic precursor, or such as a reaction mixture; such a compound or compounds that can provide the inorganic precursor can be called the inorganic precursor-source. In some examples, the inorganic precursor can be Au or ions thereof, Ag or ions thereof, $BaTiO_3$, $PbTiO_3$, $BaSe_3$, $NaYF_4$:Tm, $Fe_3O_4$ and $\gamma$-$Fe_2O_3$, CdSe, $TiO_2$, ZnO, $Cu_2O$, SnO, $SnO_2$, or any suitable ion thereof, and the like, including any suitable mixture thereof. In some examples, the material used enables the formation of nanoparticles useful in particular areas of technology, such as, for example, noble metallic nanomaterials which can be used, for example, for surface plasmonic applications (e.g., inorganic precursors such as Au or Ag or any suitable ion thereof, for example provided by inorganic precursor-sources such as any suitable salt of Au or Ag, such as for example $AgNO_3$ or $HAuCl_4$), ferroelectric nanomaterials which can be used, for example, in capacitors, transducers and actuators (e.g., inorganic precursors such as $PbTiO_3$ or $BaTiO_3$, provided by inorganic precursor sources such as for example $PbTi[OCH(CH_3)_2]_6$ or ($BaCl_2.2H_2O$+$TiCl_4$+NaOH), respectively), thermoelectric nanomaterials which can be used, for example, for converting the waste heat into electricity (e.g., inorganic precursors such as $Bi_2Te_3$ and $Bi_2Se_3$, provided by inorganic precursor-sources such as for example $BiCl_3$+Te or $BiCl_3$+Se, respectively), upconversion nanomaterials which can be used, for example, for energy and biomedical applications by converting low energy IR photons into UV and visible photons (e.g., rare-earth fluorescent; e.g., inorganic precursors such as $NaYF_4$:Tm or ions thereof, provided by inorganic precursor-sources such as for example $NaF$:$YCl_3$+$TmCl_3$), superparamagnetic ion oxide nanomaterials which can be used, for example, for magnetic device and biomedical applications ("SPION"; e.g., inorganic precursors such as $Fe_3O_4$ and $\gamma$-$Fe_2O_3$, provided by inorganic precursor-sources such as for example $FeCl_2.4H_2O$+$FeCl_3.6H_2O$+$NH_4OH$), n-type or p-type semiconductor nanomaterials which can be used, for example, for solar cells, water purification, and bioimaging and biosensors applications (e.g., inorganic precursors such as CdSe, $TiO_2$ and ZnO, or $Cu_2O$ and $SnO_2$, provided by inorganic precursor-sources such as $Cd(acac)_2$+Se, TTIP ($Ti(OC_3H_7)_4$), ($Zn(NO_3)$.6$H_2O$+KOH; or copper (I) acetate (CuOAc) and $SnCl_4.5H_2O$+hydrochloric acid), respectively, and the like).

In some examples, the inorganic precursor-source can be any suitable inorganic precursor-source. The precursor source can include $AgNO_3$ and $HAuCl_4$ to give precursors that include Ag, Au, or ions thereof. The precursor source can include $PbTi[OCH(CH_3)_2]_6$, to give precursors that include $PbTiO_3$. The precursor source can include $BaCl_2.2H_2O$+$TiCl_4$+NaOH, to give precursors that include $BaTiO_3$. The precursor source can include $BiCl_3$+Te to give precursors that include $Bi_2Te_3$, with $NaBH_4$ as the reductant and NaOH as the pH-value controller. The precursor source can include $BiCl_3$+Se to give precursors that include $Bi_2Se_3$, with $NaBH_4$ as the reductant and NaOH as the pH-value controller. The precursor source can include $NaF$:$YCl_3$ (e.g. 4:1, molar ratio) as the host material and $TmCl_3$ as the activator to form a precursor that includes $NaYF_4$:Tm; other varients include $YF_3$ as the host, and $YbCl_3$ and $HoCl_3$ as dopants ($Yb^{3+}$ serves as sensitizer and $Ho^{3+}$ is the activator). The precursor source can include $FeCl_2.4H_2O$+$FeCl_3.6H_2O$+ammonium hydroxide to give a precursor that includes $Fe_3O_4$. The precursor source can include ferric(III) acetylacetonate ($Fe(acac)_3$) to give a precursor that includes $\gamma$-$Fe_2O_3$. The precursor source can include reaction systems including $Cd(acac)_2$+Se, TTIP ($Ti(OC_3H_7)_4$) and ($Zn(NO_3)$.6$H_2O$+KOH; or copper (I) acetate (CuOAc) and $SnCl_4.5H_2O$+hydrochloric acid to give precursors that include CdSe, $TiO_2$, ZnO, $Cu_2O$, or SnO, respectively.

In some embodiments, UV-cross linking can be performed before, during, or after contacting the precursor with the copolymer. UV cross-linking can be effective to cross link homopolymer subunits including PS, PCL, or PEO subunits. Such cross-linking can cause desirable properties to occur in the nanomaterials, for example enhanced durability or strength, or altered polarity of surface functional groups.

EXAMPLES

The present invention can be better understood by reference to the following examples which are offered by way of illustration. The present invention is not limited to the examples given herein.

Example 1

Method of Preparing an Amphiphilic Multi-Arm Copolymer Including a β-CD Core with Arms Including PAA-b-PS Block Copolymers Beta-cyclodextrin (β-CD) (6.82 g) with 21 hydroxyl groups was dissolved in anhydrous 1-methyl-2-pyrrolidine (NMP, 60 mL) at about 0° C. 2-Bromoisobutyryl bromide (58.0 mL, 252 mmol) was then added dropwise to the β-CD solution while stirring. The reaction temperature was maintained at about 0° C. for about 2 h and then allowed to rise slowly to ambient temperature, after which the reaction was allowed to continue for about 22 h. The pure atom transfer radical polymerization (ATRP) macro-initiator 21Br-β-CD (18.21 g, yield=71.2%) was thus obtained after the crude product was purified by washing sequentially with saturated $NaHCO_3$ aqueous solution (200 mL) and DI water (200 mL). The chemical compositions of 21Br-β-CD were confirmed by FTIR: 2931 cm$^{-1}$($v_{C-H}$), 1737 cm$^{-1}$ ($v_{C=O}$), 1158 cm$^{-1}$ ($v_{C-O-C}$), and 1039 and 1105 cm$^{-1}$ (coupled $v_{C-C}$ and $v_{C-O}$).

Polymerization using t-butylacrylate (tBA) was then carried out using 21Br-β-CD as macroinitiator with 21 ATRP initiation sites: an ampoule charged with the CuBr (0.0707 g), N,N,N',N'',N''-pentamethyldiethylene triamine (PMDETA, 0.1707 g), 21Br-β-CD (0.1 g), tBA (42.9 mL), and methyl ethyl ketone (43 mL) was vacuumed by three freeze-thaw-cycles at the liquid $N_2$ temperature (–196° C.), then sealed and placed in an oil bath at about 60° C. The ampoules were taken out from the oil bath and dipped in liquid $N_2$ at 3 h to stop the polymerization. The solution was diluted with acetone and passed through a neutral alumina column (diameter: 10 cm, height: 20 cm) to remove the catalyst (i.e., copper salt) and then precipitated using methanol/water (50 mL/50 mL). After that, the product, 21-arm star-like β-CD-PtBA, was purified by dissolution/precipitation with acetone and methanol/water, giving 3 g of 21-arm star-like β-CD-PtBA at 76.1% yield.

A star-like β-CD-PtBA-b-PS diblock copolymer was then synthesized by ATRP using styrene and using the purified star-like β-CD-PtBA as a 21-site macroinitiator. The ATRP of styrene was carried out in anisol at about 90° C. using the PMDETA/CuBr catalyst system. The polymerization was performed in an ampoule. The reaction mixture (styrene (2.1 g): β-CD-PtBA (0.2 g): copper bromide (0.0072 g): PMDETA (0.01733 g)=800:1:1:2 molar ratio) in anisole (2.1 mL, with 1 g styrene per 1 mL solvent) was degassed with three freeze-pump-thaw cycles at the liquid $N_2$ temperature (−196° C.) and then placed in an about 90° C. oil bath which began the polymerization. After a specific polymerization time (2 h), the reaction mixtures were placed in liquid $N_2$ to stop the polymerization, and the content was diluted with THF (20 mL) and passed through a neutral alumina column (diameter: 10 cm, height: 20 cm) to remove the copper salts. The polymers were precipitated with an excess amount of methanol (50 mL), filtered, and dried under vacuum to yield 21-arm, star-like diblock copolymer β-CD-PtBA-b-PS (0.28 g, yield=93.3%).

21-Arm amphiphilic star-like β-CD-PAA-b-PS was obtained by hydrolysis of the tert-butyl ester groups of PtBA block in the PtBA-b-PS. Star-like diblock copolymer PtBA-b-PS (0.3 g) was dissolved in $CH_2Cl_2$ (30 mL), and trifluoroacetic acid (TFA, 10 mL) was added. The reaction mixture was stirred at room temperature for about 24 h. The crude product was then separated by filtration and washed with $CH_2Cl_2$ (100 mL).

Example 2

Method of Preparing Nanoparticles

Star-like β-CD-PAA-b-PS served as a template for synthesis of nanoparticles. The β-CD-PAA-b-PS (10 mg) was dissolved in a mixture of dimethylformamide (DMF, 9 mL) and benzyl alcohol (1 mL) at about room temperature, followed by the addition of appropriate the inorganic precursor-source or inorganic precursor (5 times molar amount of star-like β-CD-PAA-b-PS). The inorganic precursor was selectively incorporated into the inner hydrophilic PAA homopolymer through the coordination interaction between PAA and the precursor, but not into the outer PS homopolymer, since PS has no active functional groups to coordinate with precursor. The solution was refluxed, and the nanoparticles capped by hydrophobic PS were thus obtained. The nanoparticles capped with PS rendered them the soluble in various organic solvents (e.g, toluene, chloroform, THF, and so on).

Example 3

Noble Metallic Nanoparticles

Following the general method given in Examples 1 and 2, $AgNO_3$ (58.9 mg) or $HAuCl_4$ (0.1179 g) were used as the inorganic precursor-sources, and ethanol was used as the solvent. The reactions were controlled such that different temperatures were used for specific metals. About 100° C. was used as a reaction temperature for Ag ion inorganic precursor, with a reaction time of about 10 h. About 60° C. was used for Au ion inorganic precursor, with a reaction time of about 10 h.

Example 4

Ferroelectric Nanoparticles

Following the general method given in Examples 1 and 2, for an inorganic precursor of $PbTiO_3$, $PbTi[OCH(CH_3)_2]_6$ (0.2117 g) was utilized as the inorganic precursor-source, and the reaction was refluxed under Ar for about 2 h. An inorganic precursor source system ($BaCl_2.2H_2O+TiCl_4+NaOH$) (0.081 g+0.0658 g+0.0139 g) was employed to prepare nanoparticles having a $BaTiO_3$ inorganic precursor by refluxing under Ar for about 2 h.

Example 5

Thermoelectric Nanoparticles

Following the general method given in Examples 1 and 2, reaction systems ($BiCl_3$ (0.1089 g)+Te (0.0443 g)) and ($BiCl_3$ (0.1089 g)+Se (0.0274 g)) were used as the inorganic precursor-source for synthesis of a nanomaterial having inorganic precursors of $Bi_2Te_3$ (0.1 g, yield=71.9%) and $Bi_2Se_3$ (0.089 g, yield=76.7%), respectively. The reaction was carried out at 70° C. for about 24 h with $NaBH_4$ as the reductant and NaOH as the pH-value controller.

Example 6

Upconversion Nanoparticles

Following the general method given in Examples 1 and 2, nanoparticles having inorganic precursors of $NaYF_4$:Tm were prepared by using the inorganic precursor-sources of $NaF:YCl_3$ (4:1, molar ratio, 0.0583 g+0.0677 g) as the host material and $TmCl_3$ (0.0955 g) as the activator. The reaction system was refluxed under Ar for about 1 h.

Example 7

Superparamagnetic Ion Oxide Nanoparticle (SPION)

Following the general method given in Examples 1 and 2, starting with an inorganic precursor-source of $FeCl_2.4H_2O$ (0.0690 g)+$FeCl_3.6H_2O$ (0.09374 g)+ammonium hydroxide (2 mL), nanoparticles with an inorganic precursor of $Fe_3O_4$ were prepared. The reaction was performed at about 50° C. for about 30 min, giving nanoparticles including an inorganic precursor of $Fe_3O_4$ (0.0248 g, yield=92.5%). Similarly, nanoparticles with an inorganic precursor of $\gamma$-$Fe_2O_3$ were produced using ferric(III) acetylacetonate ($Fe(acac)_3$, 0.1225 g) as the organic precursor-source, and the mixture was refluxed for 2 h, giving nanoparticles with $\gamma$-$Fe_2O_3$ as the inorganic precursor source (0.0223 g, yield=80.5%).

Example 8

Semiconductor Nanoparticles

Following the general method given in Examples 1 and 2, a reaction system of $Cd(acac)_2$(0.1078 g)+Se (0.0273 g), TTIP ($Ti(OC_3H_7)_4$) (0.0986 g), ($Zn(NO_3).6H_2O$ (0.1032 g)+KOH (0.0195 g), or copper (I) acetate (CuOAc) (0.0425 g) and $SnCl_4.5H_2O$ (0.1216 g)+hydrochloric acid (0.5 mL) were used as inorganic precursor-source to prepare n-type semiconductor nanoparticles having inorganic precursors of CdSe (0.052 g, yield=78.3%), $TiO_2$ (0.021 g, yield=75.8%), and ZnO (0.019 g, yield=67.3%), or p-type semiconductor nanoparticles having inorganic precursors of $Cu_2O$ (0.0182 g, yield=73.3%) and SnO (0.0368 g, yield=78.7%), respectively. The reaction systems were refluxed at different times for specific inorganic precursor materials: CdSe for about 2 h, $TiO_2$ for about 2 h, ZnO for about 2 h, $Cu_2O$ for about 1 h, and SnO for about 15 h.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Additional Embodiments

The present invention provides for the following exemplary embodiments:

Embodiment 1 provides an amphiphilic multi-arm copolymer, including: a core unit; and a plurality of amphiphilic block copolymer arms, wherein each block copolymer arm is substituted on the core unit, wherein each block copolymer arm includes at least one hydrophilic homopolymer subunit and at least one hydrophobic homopolymer subunit.

Embodiment 2 provides the amphiphilic multi-arm copolymer of Embodiment 1, wherein the core unit includes at least one beta-cyclodextrin unit.

Embodiment 3 provides the amphiphilic multi-arm copolymer of any one of Embodiments 1-2, wherein the core unit includes multiple beta-cyclodextrin units, wherein the multiple beta-cyclodextrin units are linked together to form a tubular structure.

Embodiment 4 provides the amphiphilic multi-arm copolymer of any one of Embodiments 1-3, wherein the multiple beta-cyclodextrin units are linked together via a plurality of linkages.

Embodiment 5 provides the amphiphilic multi-arm copolymer of any one of Embodiments 1-4, wherein the linkages include ethyleneoxy units.

Embodiment 6 provides the amphiphilic multi-arm copolymer of any one of Embodiments 1-5, wherein the multi-arm copolymer molecule includes a bottlebrush-like block copolymer.

Embodiment 7 provides the amphiphilic multi-arm copolymer of any one of Embodiments 1-6, wherein the multi-arm copolymer molecule includes a star-like block copolymer.

Embodiment 8 provides the amphiphilic multi-arm copolymer of any one of Embodiments 2-7, wherein the amphiphilic block copolymer arms are substituted onto the beta-cyclodextrin unit via oxygen atoms that include hydroxyl groups in an unsubstituted beta-cyclodextrin molecule.

Embodiment 9 provides the amphiphilic multi-arm copolymer of any one of Embodiments 2-8, wherein the substitution of the amphiphilic block copolymer arm onto the beta-cyclodextrin unit includes substitution of a 2,2-dimethylacetyl group on an oxygen atom of the beta-cyclodextrin unit, wherein the oxygen atom includes a hydroxyl group in an unsubstituted beta-cyclodextrin molecule, wherein the at least one hydrophilic homopolymer subunit or the at least one hydrophobic homopolymer subunit of the amphiphilic block copolymer arm is a substituent at the 2-position of the 2,2-dimethylacetyl group.

Embodiment 10 provides the amphiphilic multi-arm copolymer of any one of Embodiments 2-9, wherein the substitution of the amphiphilic block copolymer arms onto the beta-cyclodextrin unit includes:

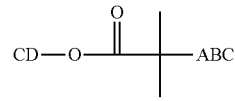

wherein CD—O represents the substituted beta-cyclodextrin unit, O represents an oxygen atom that includes a hydroxyl group in an unsubstituted beta-cyclodextrin molecule, and ABC represets the at least one hydrophilic homopolymer and the at least one hydrophobic homopolymer of the copolymer arm.

Embodiment 11 provides the amphiphilic multi-arm copolymer of any one of Embodiments 1-10, wherein the hydrophobic homopolymer subunit is selected from the group consisting of: poly(alkenylaryl) units, poly(alkenylheteroaryl) units, and poly(lactam) units.

Embodiment 12 provides the amphiphilic multi-arm copolymer of any one of Embodiments 1-11, wherein the hydrophobic homopolymer subunit is selected from the group consisting of: polystyrene (PS) units, poly(4-vinylpyridine) (P4VP) units, and polycaprolactam (PCL) units.

Embodiment 13 provides the amphiphilic multi-arm copolymer of any one of Embodiments 1-12, wherein the hydrophilic homopolymer subunit is selected from the group consisting of: poly(alkyl alkenoate) units, poly(alkenoic acid) units, and poly(alkylene oxide) units.

Embodiment 14 provides the amphiphilic multi-arm copolymer of any one of Embodiments 1-13, wherein the hydrophilic homopolymer subunit is selected from the group consisting of: poly(t-butyl acrylate) (PtBA) units, poly(acrylic acid) (PAA) units, and poly(ethylene oxide) (PEO) units.

Embodiment 15 provides the amphiphilic multi-arm copolymer of any one of Embodiments 1-14, wherein the amphiphilic block copolymer arms include a 2,2-dimethylacetyl group substituted at the 2-position by a block copolymer selected from the group consisting of: poly(alkyl alkenoate)-b-poly(alkenylaryl), poly(alkyl alkenoate)-b-poly(alkenylheteroaryl), poly(alkyl alkenoate)-b-poly(lactam), poly(alkenoic acid)-b-poly(alkenylaryl), poly(alkenoic acid)-b-poly(alkenylheteroaryl), poly(alkenoic acid)-b-poly(lactam), poly(alkylene oxide)-b-poly(alkenylaryl), poly(alkylene oxide)-b-poly(alkenylheteroaryl), poly(alkylene oxide)-b-poly(lactam), poly(alkenylaryl)-b-poly(alkyl alkenoate), poly(alkenylaryl)-b-poly(alkenoic acid), poly(alkenylaryl)-b-poly(alkylene oxide), poly(alkenylheteroaryl)-b-poly(alkyl alkenoate), poly(alkenylheteroaryl)-b-poly(alkenoic acid), poly(alkenylheteroaryl)-b-poly(alkylene oxide), poly(lactam)-b-poly(alkyl alkenoate), poly(lactam)-b-poly(alkenoic acid), and poly(lactam)-b-poly(alkylene oxide).

Embodiment 16 provides the amphiphilic multi-arm copolymer of any one of Embodiments 1-15, wherein the amphiphilic block copolymer arms include a 2,2-dimethylacetyl group substituted at the 2-position by a block copolymer selected from the group consisting of: PtBA-b-PA, PtBA-b-P4VP, PtBA-b-PCL, PAA-b-PS, PAA-b-P4VP, PAA-b-

PCL, PEO-b-PS, PEO-b-P4VP, PEO-b-PCL, PS-b-PtBA, PS-b-PAA, PS-b-PEO, P4VP-b-PtBA, P4VP-b-PAA, P4VP-b-PEO, PCL-b-PtBA, PCL-b-PAA, and PCL-b-PEO.

Embodiment 17 provides the amphiphilic multi-arm copolymer of any one of Embodiments 1-16, wherein the hydrophilic homopolymer subunits of the amphiphilic block copolymer arms are nearer to the core unit that the hydrophobic homopolymer subunits of the amphiphilic block copolymer arms.

Embodiment 18 provides the amphiphilic multi-arm copolymer of any one of Embodiments 1-17, wherein the hydrophobic homopolymer subunits of the amphiphilic block copolymer arms are nearer to the core unit than the hydrophilic homopolymer subunits of the amphiphilic block copolymer arms.

Embodiment 19 provides a nanomaterial, including the amphiphilic multi-arm copolymer of any one of Embodiments 1-18, further including: at least one inorganic precursor, wherein the inorganic precursor is coordinated to at least one homopolymer subunit of one of the amphiphilic block copolymer arms.

Embodiment 20 provides the nanomaterial of Embodiment 19, wherein the inorganic precursor is coordinated to at least one homopolymer subunit of each of more than one of the amphiphilic block copolymer arms.

Embodiment 21 provides the nanomaterial of any one of Embodiments 19-20, wherein the amphiphilic block copolymer includes at least one amphiphilic block copolymer arm having at least one PAA or P4VP homopolymer subunit, wherein the inorganic precursor is coordinated to at least one of the PAA or P4VP homopolymer subunits.

Embodiment 22 provides the nanomaterial of any one of Embodiments 19-21, wherein the amphiphilic block copolymer includes at least one amphiphilic block copolymer arm having at least one polyacrylic acid homopolymer subunit, wherein the inorganic precursor is coordinated to the polyacrylic acid homopolymer subunit.

Embodiment 23 provides the nanomaterial of any one of Embodiments 19-22, wherein the inorganic precursor is selected from the group consisting of: Au or ions thereof, Ag or ions thereof, $PbTiO_3$, $BaTiO_3$, $BaSe_3$, $NaYF_4$:Tm, $Fe_3O_4$ and $\gamma$-$Fe_2O_3$, CdSe, $TiO_2$, ZnO, $Cu_2O$, or $SnO_2$.

Embodiment 24 provides the nanomaterial of any one of Embodiments 19-23, wherein the nanomaterial includes: a nanoparticle, a hollow nanoparticle, a core/shell nanoparticle, a nanotube, or a nanorod.

Embodiment 25 provides the nanomaterial of any one of Embodiments 19-24, wherein the nanomaterial includes a Janus nanomaterial.

Embodiment 26 provides a nanomaterial, including a nanomaterial derived from the nanomaterial of any one of Embodiments 19-25.

Embodiment 27 provides a method of making an amphiphilic multi-arm copolymer, including: providing a core that includes hydroxyl functional groups; contacting the core with a halogenated esterification reagent, to give a macro-initiator core that includes the core with at least some of the hydroxyl functional groups esterified by the halogenated esterification reagent; contacting the macro-initiator core with a first homopolymer subunit precursor, to give a first substituted core including the macro-initiator core wherein at least one halogen atom is replaced with a first homopolymer including subunits that include a reaction product of the first homopolymer subunit precursor; and contacting the first substituted core with a second homopolymer subunit precursor, wherein the second homopolymer subunit precursor is different than the first homopolymer subunit precursor, to give a second substituted core including the first substituted core wherein the first homopolymer is substituted with a second homopolymer that includes subunits that include a reaction product of the second homopolymer subunit precursor; wherein the first and second homopolymer together include an amphiphilic block copolymer.

Embodiment 28 provides the method of Embodiment 27, further including: contacting the second substituted core with a third homopolymer subunit precursor, wherein the third homopolymer subunit precursor is different than the second homopolymer precursor, to give a third substituted core including the second substituted core wherein the second homopolymer is substituted with a third homopolymer that includes subunits that include a reaction product of the third homopolymer subunit precursor.

Embodiment 29 provides the method of any one of Embodiments 27-28, wherein the core includes beta-cyclodextrin.

Embodiment 30 provides the method of any one of Embodiments 27-29, wherein the halogenated esterification reagent includes 2-bromoisobutyryl bromide.

Embodiment 31 provides the method of any one of Embodiments 27-30, wherein the first or second homopolymer subunit precursor includes an alkyl alkenoate, an alkenoic acid, an alkylene glycol, a alkenylaryl compound, an alkenylheteroaryl compound, or a lactam.

Embodiment 32 provides the method of any one of Embodiments 27-31, wherein the first or second homopolymer subunit precursor includes t-butyl acrylate, acrylic acid, ethylene glycol, styrene, 4-vinylpyridine, or caprolactam.

Embodiment 33 provides a method of making a nanomaterial, including: contacting the amphiphilic multi-arm copolymer of any one of Embodiments 1-18 with an inorganic precursor, to form a nanomaterial that includes the amphiphilic multi-arm copolymer coordinated to the inorganic precursor.

Embodiment 34 provides a method of making a nanomaterial, including the method of any one of Embodiments 27-33, further including: contacting the amphiphilic multi-arm copolymer with an inorganic precursor, to form a nanomaterial that includes the amphiphilic multi-arm copolymer coordinated to the inorganic precursor.

Embodiment 35 provides the method of Embodiment 34, wherein the inorganic precursor is selected from the group consisting of: Au or ions thereof, Ag or ions thereof, $PbTiO_3$, $BaTiO_3$, $BaSe_3$, $NaYF_4$:Tm, $Fe_3O_4$ and $\gamma$-$Fe_2O_3$, CdSe, $TiO_2$, ZnO, $Cu_2O$, or $SnO_2$.

Embodiment 36 provides the method of any one of Embodiments 34-35, wherein the inorganic precursor is provided by an inorganic precursor-source.

Embodiment 37 provides the apparatus or method of any one or any combination of Embodiments 1-36 such that all elements or options recited are available to use or select from.

We claim:
1. A nanomaterial comprising:
   an amphiphilic multi-arm copolymer, comprising
      a core unit; and
      a plurality of amphiphilic block copolymer arms, wherein each block copolymer arm is substituted on the core unit, wherein each block copolymer arm comprises at least one hydrophilic homopolymer subunit and at least one hydrophobic homopolymer subunit; and
   at least one inorganic precursor, wherein the inorganic precursor is coordinated to at least one homopolymer subunit of one of the amphiphilic block copolymer arms.

2. The nanomaterial of claim 1, wherein the inorganic precursor is coordinated to at least one homopolymer subunit of each of more than one of the amphiphilic block copolymer arms.

3. The nanomaterial of claim 1, wherein the amphiphilic block copolymer includes at least one amphiphilic block copolymer arm having at least one PAA or P4VP homopolymer subunit, wherein the inorganic precursor is coordinated to at least one of the PAA or P4VP homopolymer subunits.

4. The nanomaterial of claim 1, wherein the inorganic precursor is selected from the group consisting of: Au or ions thereof, Ag or ions thereof, $PbTiO_3$, $BaTiO_3$, $BaSe_3$, $NaYF_4$:Tm, $Fe_3O_4$ and $\gamma\text{-}Fe_2O_3$, CdSe, $TiO_2$, ZnO, $Cu_2O$, and $SnO_2$.

5. The nanomaterial of claim 1, wherein the nanomaterial comprises: a nanoparticle, a hollow nanoparticle, a core/shell nanoparticle, a nanotube, or a nanorod.

6. A nano material, comprising a nanomaterial derived from the nanomaterial of claim 1.

7. A method of making a nanomaterial, comprising:
contacting an amphiphilic multi-arm copolymer with an inorganic precursor, to form a nanomaterial that comprises the amphiphilic multi-arm copolymer coordinated to the inorganic precursor, the amphiphilic multi-arm copolymer comprising
a core unit; and
a plurality of amphiphilic block copolymer arms, wherein each block copolymer arm is substituted on the core unit, wherein each block copolymer arm comprises at least one hydrophilic homopolymer subunit and at least one hydrophobic homopolymer subunit.

8. The nanomaterial of claim 1, wherein the core unit comprises at least one beta-cyclodextrin unit.

9. The nanomaterial of claim 8, wherein the amphiphilic block copolymer arms are substituted onto the beta-cyclodextrin unit via oxygen atoms that comprise hydroxyl groups in an unsubstituted beta-cyclodextrin molecule.

10. The nanomaterial of claim 8, wherein the substitution of the amphiphilic block copolymer arms onto the beta-cyclodextrin unit comprises:

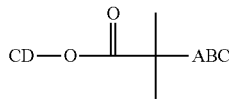

wherein CD—O represents the substituted beta-cyclodextrin unit, O represents an oxygen atom that comprises a hydroxyl group in an unsubstituted beta-cyclodextrin molecule, and ABC represents the at least one hydrophilic homopolymer and the at least one hydrophobic homopolymer of the copolymer arm.

11. The nanomaterial of claim 1, wherein the hydrophobic homopolymer subunit is selected from the group consisting of: poly(alkenylaryl) units, poly(alkenylheteroaryl) units, and poly(lactam) units.

12. The nanomaterial of claim 1, wherein the hydrophobic homopolymer subunit is selected from the group consisting of: polystyrene (PS) units, poly(4-vinylpyridine) (P4VP) units, and polycaprolactam (PCL) units.

13. The nanomaterial of claim 1, wherein the hydrophilic homopolymer subunit is selected from the group consisting of: poly(alkyl alkenoate) units, poly(alkenoic acid) units, and poly(alkylene oxide) units.

14. The nanomaterial of claim 1, wherein the hydrophilic homopolymer subunit is selected from the group consisting of: poly(t-butyl acrylate) (PtBA) units, poly(acrylic acid) (PAA) units, and poly(ethylene oxide) (PEO) units.

15. The nanomaterial of claim 1, wherein the amphiphilic block copolymer arms comprise a 2,2-dimethylacetyl group substituted at the 2-position by a block copolymer selected from the group consisting of: poly(alkyl alkenoate)-b-poly(alkenylaryl), poly(alkyl alkenoate)-b-poly(alkenylheteroaryl), poly(alkyl alkenoate)-b-poly(lactam), poly(alkenoic acid)-b-poly(alkenylaryl), poly(alkenoic acid)-b-poly(alkenylheteroaryl), poly(alkenoic acid)-b-poly(lactam), poly(alkylene oxide)-b-poly(alkenylaryl), poly(alkylene oxide)-b-poly(alkenylheteroaryl), poly(alkylene oxide)-b-poly(lactam), poly(alkenylaryl)-b-poly(alkyl alkenoate), poly(alkenylaryl)-b-poly(alkenoic acid), poly(alkenylaryl)-b-poly(alkylene oxide), poly(alkenylheteroaryl)-b-poly(alkyl alkenoate), poly(alkenylheteroaryl)-b-poly(alkenoic acid), poly(alkenylheteroaryl)-b-poly(alkylene oxide), poly(lactam)-b-poly(alkyl alkenoate), poly(lactam)-b-poly(alkenoic acid), and poly(lactam)-b-poly(alkylene oxide).

16. The amphiphilic multi-arm copolymer of claim 1, wherein the amphiphilic block copolymer arms comprise a 2,2-dimethylacetyl group substituted at the 2-position by a block copolymer selected from the group consisting of: PtBA-b-PS, PtBA-b-P4VP, PtBA-b-PCL, PAA-b-PS, PAA-b-P4VP, PAA-b-PCL, PEO-b-PS, PEO-b-P4VP, PEO-b-PCL, PS-b-PtBA, PS-b-PAA, PS-b-PEO, P4VP-b-PtBA, P4VP-b-PAA, P4VP-b-PEO, PCL-b-PtBA, PCL-b-PAA, and PCL-b-PEO.

* * * * *

UNITED STATES PATENT AND TRADEMARK OFFICE
CERTIFICATE OF CORRECTION

PATENT NO.       : 8,445,577 B2
APPLICATION NO.  : 13/189800
DATED            : May 21, 2013
INVENTOR(S)      : Lin et al.

It is certified that error appears in the above-identified patent and that said Letters Patent is hereby corrected as shown below:

On the Title page, in column 2, item (56), under "Other Publications", line 15, delete "J.M.," and insert --J. M.--, therefor In the Specifications:

In column 2, line 40, after "uncovering,", delete "ferroelectric", therefor

In column 2, line 46-47, delete "nansotube" and insert --nanotube--, therefor

In column 5, line 57, delete "4,-epoxycyclohexyl)" and insert --4-epoxycyclohexyl)--, therefor In column 7, line 20, after "(pyridy 1-3-carbonyl)", delete "group", therefor In column 7, line 42, delete "2,4-2,5-" and insert --2,4-, 2,5- --, therefor In column 9, line 12-13, delete "1,2,3-triazol-2-yl" and insert --1,2,3-triazol-2-yl,--, therefor In column 9, line 13, delete "yl-1,2,3" and insert --yl, 1,2,3--, therefor In column 14, line 67, delete "similarly" and insert --similarity--, therefor In column 16, line 60, after "PEO", insert --.--, therefor In column 20, line 10, delete "copopolymer" and insert --copolymer--, therefor In column 26, line 15, after "acid", insert --)--, therefor In column 26, line 52, delete "cm$^{-1}$(" and insert --cm$^{-1}$ (--, therefor Signed and Sealed this
First Day of October, 2013

Teresa Stanek Rea
*Deputy Director of the United States Patent and Trademark Office*

CERTIFICATE OF CORRECTION (continued)
U.S. Pat. No. 8,445,577 B2

In column 27, line 43, after "appropriate", delete "the", therefor

In column 27, line 53, delete "e.g,", insert --e.g.,--, therefor

In column 28, line 60, delete "Cd(acac)$_2$(0.1078" and insert --Cd(acac)$_2$ (0.1078--, therefor In column 28, line 63, after "(0.5 mL)", insert --)--, therefor In column 31, line 7, delete "that" and insert --than--, therefor In the Claims:

In column 32, line 57, in Claim 1, delete "comprising" and insert --comprising:--, therefor In column 33, line 17, in Claim 6, delete "nano material" and insert --nanomaterial--, therefor In column 33, line 24, in Claim 7, delete "comprising" and insert --comprising:--, therefor